United States Patent
David et al.

(10) Patent No.: US 11,853,109 B1
(45) Date of Patent: *Dec. 26, 2023

(54) SECURELY MANIPULATING AND UTILIZING USER CREDENTIALS

(71) Applicant: VIM INC., San Francisco, CA (US)

(72) Inventors: Asaf David, Tel Aviv (IL); Nicolas Mendzylewski, Tel Aviv (IL); Moran Shemesh, Tel Aviv (IL); Chen Rozenes, Tel Aviv (IL); Daniel Hallel Jakobsen, Givatayim (IL); Nandy Vaisman, Tel Aviv (IL)

(73) Assignee: VIM INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/072,825

(22) Filed: Dec. 1, 2022

Related U.S. Application Data

(63) Continuation of application No. 17/978,765, filed on Nov. 1, 2022.

(51) Int. Cl.
   *G06F 21/45* (2013.01)

(52) U.S. Cl.
   CPC .................. *G06F 21/45* (2013.01)

(58) Field of Classification Search
   CPC ........................................ G06F 21/45
   USPC .......................................... 726/19
   See application file for complete search history.

(56) References Cited

U.S. PATENT DOCUMENTS

| | | | |
|---|---|---|---|
| 10,776,480 B2* | 9/2020 | Humble | H04L 63/083 |
| 2003/0131266 A1* | 7/2003 | Best | H04L 63/20 713/184 |
| 2009/0307058 A1* | 12/2009 | Murphy | G06Q 30/02 705/7.29 |
| 2013/0283361 A1* | 10/2013 | Rao | H04L 9/3236 726/9 |
| 2018/0191688 A1* | 7/2018 | Chen | H04L 9/3226 |
| 2018/0270065 A1* | 9/2018 | Brown | H04L 9/0861 |
| 2020/0403958 A1* | 12/2020 | El Moujahid | H04L 51/52 |
| 2022/0070000 A1* | 3/2022 | Gondza | H04L 63/123 |

* cited by examiner

*Primary Examiner* — Kambiz Zand
*Assistant Examiner* — Aubrey H Wyszynski
(74) *Attorney, Agent, or Firm* — MYERS WOLIN, LLC

(57) ABSTRACT

A method, system, and apparatus comprising: automatically identifying a login session to a first software system in a Graphical User Interface (GUI) of a user device; automatically extracting user credentials from the login session; automatically manipulating at least a portion of the user credentials to obtain manipulated credentials; automatically verifying that the login session is authentic by: encrypting the user credentials, providing the encrypted credentials to a separate environment, and reconstructing the login session at the separate environment; and automatically adding the manipulated credentials to an account of the user in a second software system that is independent from the separate environment.

25 Claims, 5 Drawing Sheets

SECURELY MANIPULATING AND UTILIZING USER CREDENTIALS

CROSS-REFERENCE TO RELATED APPLICATION

This application is a continuation of U.S. application Ser. No. 17/978,765 filed on Nov. 11, 2022, which is hereby incorporated by reference in its entirety without giving rise to disavowment.

TECHNICAL FIELD

The present disclosure relates to login sessions in general, and to signing on to systems automatically, in particular.

BACKGROUND

A Single Sign-On (SSO) may comprise a service that allows a user to use a single set of credentials in order to log in to any of several related, yet independent, software systems. In some exemplary embodiments, the SSO service allows a user to log in once and to use the credentials as a key for accessing services of related software systems without re-entering her credentials. The single authentication may provide access to multiple related applications by passing an authentication token to the related applications.

BRIEF SUMMARY

One exemplary embodiment of the disclosed subject matter is a method comprising: automatically identifying a login session in a Graphical User Interface (GUI) of a user device, wherein the login session is configured to enable a user of the user device to login to a first software system; automatically extracting one or more user credentials from the login session, wherein the one or more user credentials comprise one or more user inputs to the login session; automatically manipulating at least a portion of the one or more user credentials using one or more manipulations, thereby obtaining manipulated credentials; automatically verifying the login session, wherein said verifying comprises ensuring that the login session is authentic, wherein said verifying comprises: encrypting the one or more user credentials, thereby obtaining encrypted credentials, providing the encrypted credentials to a separate environment, and reconstructing the login session at the separate environment, thereby obtaining a reconstructed login session; and automatically adding the manipulated credentials to an account of the user in a second software system, wherein the manipulated credentials can be utilized to login to the account, wherein the second software system is independent from the separate environment.

Optionally, said adding the manipulated credentials to the account of the user comprises creating the account for the user in the second software system.

Optionally, the method further comprises automatically extracting, at the separate environment, user details from the reconstructed login session, wherein the separate environment comprises a sandbox environment, automatically providing the user details from the sandbox environment to the second software system, and automatically populating, at the second software system, fields of the account using the user details.

Optionally, the method further comprises prompting the user to confirm populated content of the fields of the account.

Optionally, said encrypting comprises encrypting the one or more user credentials using a public key of a backend browser, wherein the backend browser is executed in the separate environment, wherein said reconstructing the login session comprises navigating to the login session via the backend browser.

Optionally, the backend browser comprises a backend browser that is devoid of any GUI.

Optionally, said verifying comprises matching a domain name of the login session to a list of authorized domain names associated with the first software system.

Optionally, the method further comprises automatically extracting a domain name of the login session as part of said automatically extracting, analyzing the domain name to detect an organization name, and detecting the account of the user in the second software system based on the organization name.

Optionally, said manipulating comprises applying a one-way function on the one or more user credentials, whereby limiting an ability of deriving the one or more user credentials from the manipulated credentials.

Optionally, said manipulating comprises obtaining a user-specific salt, adding the user-specific salt to the one or more user credentials, thereby obtaining salted user credentials, and applying a one-way function to the salted user credentials, to thereby limit an ability of deriving the one or more user credentials from the manipulated credentials.

Optionally, the method further comprises identifying that at least one manipulation record is absent from a local storage of the user device, wherein the at least one manipulation record is configured to manipulate the one or more user credentials; generating the at least one manipulation record, thereby generating the one or more manipulations; and performing said manipulating using the at least one manipulation record.

Optionally, said manipulating is performed after identifying that the login session enabled the user to login to the first software system.

Optionally, the second software system is configured to extend a functionality of the first software system.

Optionally, the GUI of the first software system is executed using a browser, wherein the second software system is associated with a browser extension that is executed by the browser, whereby the second software system provides an augmented functionality providing an additional functionality to the GUI of the first software system via an overlay over a page displayed by the browser.

Optionally, the GUI of the first software system is executed using a desktop application, wherein the second software system is associated with a desktop agent that is executed over the desktop application, whereby the second software system provides an augmented functionality providing an additional functionality to the GUI of the first software system via an overlay over a page displayed by the desktop application.

Optionally, the separate environment comprises an on-premise sandbox environment.

Optionally, the method further comprises automatically identifying a second login session of the user to the first software system; automatically extracting the one or more user credentials from the second login session; automatically manipulating the at least the portion of the one or more user credentials extracted from the second login session using the one or more manipulation thereby obtaining the manipulated credentials; and logging into the second software system using the manipulated credentials, whereby the user is logged into the second software systems without the user manually providing credentials to the second software system.

Another exemplary embodiment of the disclosed subject matter is an apparatus comprising a processor and coupled memory, said processor being adapted to: automatically identify a login session in a GUI of a user device, wherein the login session is configured to enable a user of the user device to login to a first software system; automatically extract one or more user credentials from the login session, wherein the one or more user credentials comprise one or more user inputs to the login session; automatically manipulate at least a portion of the one or more user credentials using one or more manipulations, thereby obtaining manipulated credentials; automatically verify the login session, wherein said verify comprises ensuring that the login session is authentic, wherein said verify comprises: encrypting the one or more user credentials, thereby obtaining encrypted credentials, providing the encrypted credentials to a separate environment, and reconstructing the login session at the separate environment, thereby obtaining a reconstructed login session; and automatically add the manipulated credentials to an account of the user in a second software system, wherein the manipulated credentials can be utilized to login to the account, wherein the second software system is independent from the separate environment.

Yet another exemplary embodiment of the disclosed subject matter is a system comprising a processor and coupled memory, said processor being adapted to: automatically identify a login session in a GUI of a user device, wherein the login session is configured to enable a user of the user device to login to a first software system; automatically extract one or more user credentials from the login session, wherein the one or more user credentials comprise one or more user inputs to the login session; automatically manipulate at least a portion of the one or more user credentials using one or more manipulations, thereby obtaining manipulated credentials; automatically verify the login session, wherein said verify comprises ensuring that the login session is authentic, wherein said verify comprises: encrypting the one or more user credentials, thereby obtaining encrypted credentials, providing the encrypted credentials to a separate environment, and reconstructing the login session at the separate environment, thereby obtaining a reconstructed login session; and automatically add the manipulated credentials to an account of the user in a second software system, wherein the manipulated credentials can be utilized to login to the account, wherein the second software system is independent from the separate environment.

Yet another exemplary embodiment of the disclosed subject matter is a computer program product comprising a non-transitory computer readable medium retaining program instructions, which program instructions when read by a processor, cause the processor to: automatically identify a login session in a GUI of a user device, wherein the login session is configured to enable a user of the user device to login to a first software system; automatically extract one or more user credentials from the login session, wherein the one or more user credentials comprise one or more user inputs to the login session; automatically manipulate at least a portion of the one or more user credentials using one or more manipulations, thereby obtaining manipulated credentials; automatically verify the login session, wherein said verify comprises ensuring that the login session is authentic, wherein said verify comprises: encrypting the one or more user credentials, thereby obtaining encrypted credentials, providing the encrypted credentials to a separate environment, and reconstructing the login session at the separate environment, thereby obtaining a reconstructed login session; and automatically add the manipulated credentials to an account of the user in a second software system, wherein the manipulated credentials can be utilized to login to the account, wherein the second software system is independent from the separate environment.

Yet another exemplary embodiment of the disclosed subject matter is a method comprising: automatically identifying a login session in a GUI of a user device, wherein the login session is configured to enable a user of the user device to login to a first software system; automatically extracting one or more user credentials from the login session, wherein the one or more user credentials comprise one or more user inputs to the login session; automatically manipulating at least a portion of the one or more user credentials using one or more manipulations, thereby obtaining manipulated credentials; automatically verifying the login session, wherein said verifying comprises ensuring that the login session is authentic, wherein said verifying comprises: providing a session token of the login session to a separate environment, invoking Application Programming Interface (API) calls from the separate environment to the first software system, the API calls providing the session token to the first software system, and obtaining, at the separate environment, verification data from the first software system, wherein the verification data is determined by the first software system based on the session token; and automatically adding the manipulated credentials to an account of the user in a second software system, wherein the manipulated credentials can be utilized to login to the account, wherein the second software system is independent from the separate environment.

Optionally, said verifying the login session further comprises: providing a username from the one or more user credentials to the separate environment, wherein a password from the one or more user credentials is not provided to the separate environment; and utilizing the API calls to verify an identity of the user by the first software system, wherein the first software system is configured to identify an account of the user in the first software system based on the session token and to provide the verification data to the separate environment, wherein said utilizing comprises comparing the username to the verification data to ensure that they match, whereby the login session is identified without providing the password to any device that is external from the user device.

Optionally, said adding the manipulated credentials to the account of the user comprises creating the account for the user in the second software system.

Optionally, said verifying comprises matching a domain name of the login session to a list of authorized domain names associated with the first software system.

Optionally, the method further comprises automatically extracting a domain name of the login session as part of said automatically extracting, analyzing the domain name to detect an organization name, and detecting the account of the user in the second software system based on the organization name.

Optionally, said manipulating comprises applying a one-way function on the one or more user credentials, whereby limiting an ability of deriving the one or more user credentials from the manipulated credentials.

Optionally, said manipulating comprises obtaining a user-specific salt, adding the user-specific salt to the one or more user credentials, thereby obtaining salted user credentials, and applying a one-way function to the salted user credentials, to thereby limit an ability of deriving the one or more user credentials from the manipulated credentials.

Optionally, the method further comprises identifying that at least one manipulation record is absent from a local storage of the user device, wherein the at least one manipulation record is configured to manipulate the one or more user credentials; generating the at least one manipulation record, thereby generating the one or more manipulations; and performing said manipulating using the at least one manipulation record.

Optionally, said manipulating is performed after identifying that the login session enabled the user to login to the first software system.

Optionally, the second software system is configured to extend a functionality of the first software system.

Optionally, the GUI of the first software system is executed using a browser, wherein the second software system is associated with a browser extension that is executed by the browser, whereby the second software system provides an augmented functionality providing an additional functionality to the GUI of the first software system via an overlay over a page displayed by the browser.

Optionally, the GUI of the first software system is executed using a desktop application, wherein the second software system is associated with a desktop agent that is executed over the desktop application, whereby the second software system provides an augmented functionality providing an additional functionality to the GUI of the first software system via an overlay over a page displayed by the desktop application.

Optionally, the separate environment comprises an on-premise sandbox environment.

Optionally, the method further comprises automatically identifying a second login session of the user to the first software system; automatically extracting the one or more user credentials from the second login session; automatically manipulating the at least the portion of the one or more user credentials extracted from the second login session using the one or more manipulation thereby obtaining the manipulated credentials; and logging into the second software system using the manipulated credentials, whereby the user is logged into the second software systems without the user manually providing credentials to the second software system.

Another exemplary embodiment of the disclosed subject matter is an apparatus comprising a processor and coupled memory, said processor being adapted to: automatically identify a login session in a GUI of a user device, wherein the login session is configured to enable a user of the user device to login to a first software system; automatically extract one or more user credentials from the login session, wherein the one or more user credentials comprise one or more user inputs to the login session; automatically manipulate at least a portion of the one or more user credentials using one or more manipulations, thereby obtaining manipulated credentials; automatically verify the login session, wherein said verify comprises ensuring that the login session is authentic, wherein said verify comprises: providing a session token of the login session to a separate environment, invoking API calls from the separate environment to the first software system, the API calls providing the session token to the first software system, and obtaining, at the separate environment, verification data from the first software system, wherein the verification data is determined by the first software system based on the session token; and automatically add the manipulated credentials to an account of the user in a second software system, wherein the manipulated credentials can be utilized to login to the account, wherein the second software system is independent from the separate environment.

Yet another exemplary embodiment of the disclosed subject matter is a system comprising a processor and coupled memory, said processor being adapted to: automatically identify a login session in a GUI of a user device, wherein the login session is configured to enable a user of the user device to login to a first software system; automatically extract one or more user credentials from the login session, wherein the one or more user credentials comprise one or more user inputs to the login session; automatically manipulate at least a portion of the one or more user credentials using one or more manipulations, thereby obtaining manipulated credentials; automatically verify the login session, wherein said verify comprises ensuring that the login session is authentic, wherein said verify comprises: providing a session token of the login session to a separate environment, invoking API calls from the separate environment to the first software system, the API calls providing the session token to the first software system, and obtaining, at the separate environment, verification data from the first software system, wherein the verification data is determined by the first software system based on the session token; and automatically add the manipulated credentials to an account of the user in a second software system, wherein the manipulated credentials can be utilized to login to the account, wherein the second software system is independent from the separate environment.

Yet another exemplary embodiment of the disclosed subject matter is a computer program product comprising a non-transitory computer readable medium retaining program instructions, which program instructions when read by a processor, cause the processor to: automatically identify a login session in a GUI of a user device, wherein the login session is configured to enable a user of the user device to login to a first software system; automatically extract one or more user credentials from the login session, wherein the one or more user credentials comprise one or more user inputs to the login session; automatically manipulate at least a portion of the one or more user credentials using one or more manipulations, thereby obtaining manipulated credentials; automatically verify the login session, wherein said verify comprises ensuring that the login session is authentic, wherein said verify comprises: providing a session token of the login session to a separate environment, invoking API calls from the separate environment to the first software system, the API calls providing the session token to the first software system, and obtaining, at the separate environment, verification data from the first software system, wherein the verification data is determined by the first software system based on the session token; and automatically add the manipulated credentials to an account of the user in a second software system, wherein the manipulated credentials can be utilized to login to the account, wherein the second software system is independent from the separate environment.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
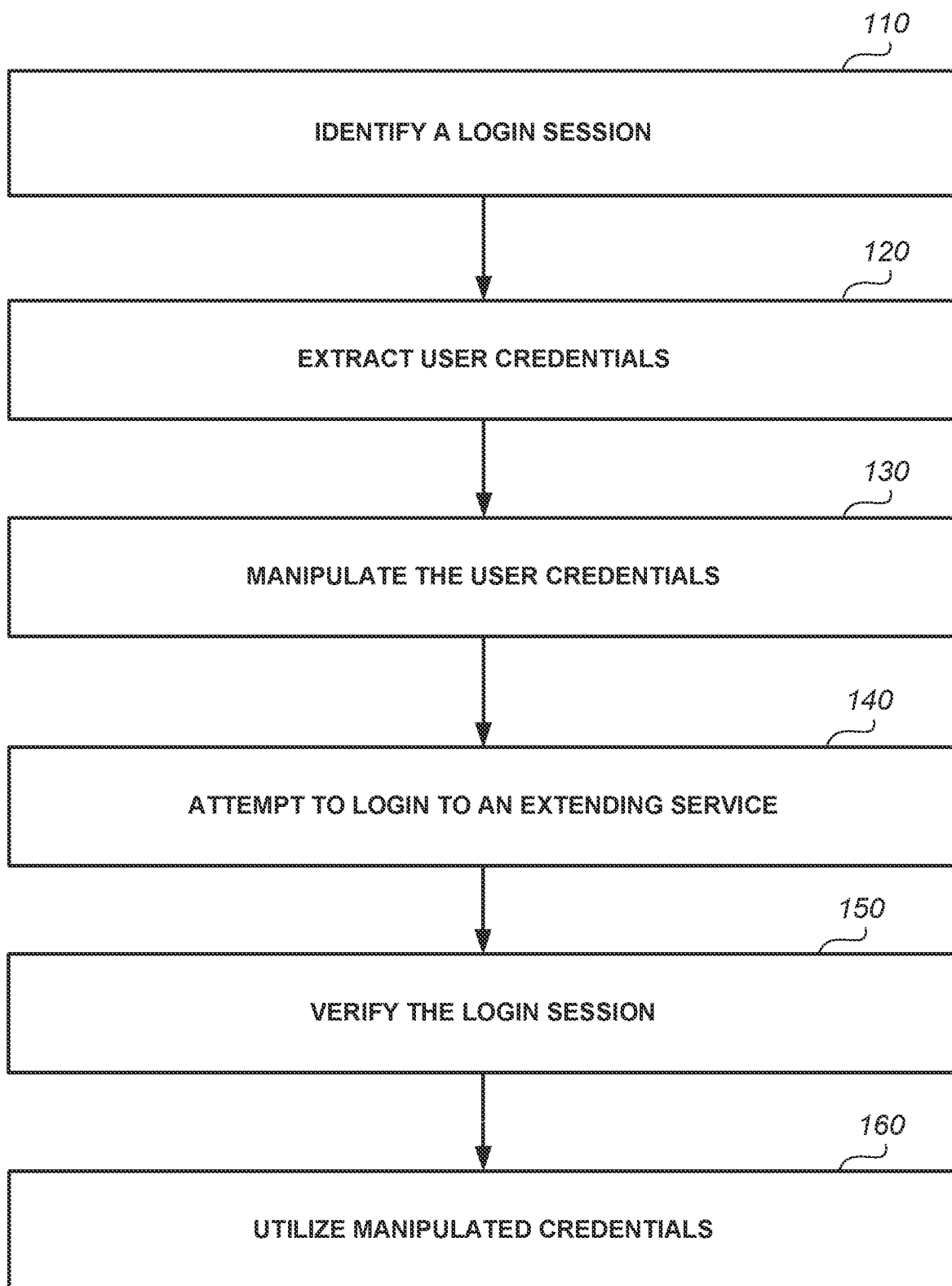
FIG. 1 illustrates an exemplary flowchart diagram of a method, in accordance with some exemplary embodiments of the disclosed subject matter.

One technical problem dealt with by the disclosed subject matter is enabling a user to use a single set of credentials in order to login to two or more software systems such as applications, webpages, services, or the like, without re-entering her credentials or using two or more sets of different credentials. In some cases, the software systems that the user may desire to login to may comprise two or more associated systems, two or more independent systems, systems that can augment functionality to one another, or the like.

Another technical problem dealt with by the disclosed subject matter is enabling a user to, upon signing in to one or more first services, automatically sign in to at least one second service that may be configured to be executed over the first services. For example, the second service may be associated to a first service, may be configured to provide additional data or functionality thereto, or the like. In some cases, the second service may belong to one or more suppliers, vendors, entities, distributers, or the like (referred to as 'suppliers'), that are different than the suppliers of the first services. In some exemplary embodiments, it may be desired to enable a user to automatically sign in to the second service upon utilizing the first services, without being required to manually log in to the second service using different or overlapping user credentials.

A naïve solution may comprise utilizing a Single Sign-On (SSO) service to automatically sign in to a second service upon loading a page of a first service. An SSO service may allow a user to login to any of several related software systems using a single identifier (ID) and password, by logging in once and accessing services of the related software systems without re-entering the credentials. The single authentication may provide access to multiple related applications by passing the authentication token to the related applications.

In some exemplary embodiments, the naïve solution of utilizing an SSO service may have one or more drawbacks. In some exemplary embodiments, a first system may be implemented in a manner that utilizes a non-SSO authentication scheme, that does not support an SSO service, that does not enable to integrate an SSO service, that has security constraints that restricts a usage of the SSO service, or the like. In some cases, privacy regulations or constraints may prevent the first service from passing the authentication token to the second service. In some cases, the SSO service may not be feasible for systems that do not enable or support cooperation or communications between the systems' backends, such as sensitive data systems. In some cases, a small entity may not have sufficient resources for implementing SSO integration. It may be desired to overcome such drawbacks, and provide a global solution.

Yet another technical problem dealt with by the disclosed subject matter is enabling a user to use a single set of credentials in order to login to two or more software systems, without utilizing an SSO service, and without relying on trust between the systems. In some exemplary embodiments, in case that the SSO service cannot be used, it may be desired to provide a trustless independent mechanism that enables a user to login to two or more software systems using a single set of credentials, without integrating the backends of systems, without relying on trust or communications between the systems, without requiring the mechanism to be specifically tailored for client systems, or the like.

Yet another technical problem dealt with by the disclosed subject matter is enabling a second service such as an extending service, to extend a functionality or content of a rendered page of one or more first services, without requiring the user that is rendering the page to login separately to the extending service. A rendered page may comprise a page browsed by a browser, a page of a desktop application, or the like. In some exemplary embodiments, the rendered page may, in some cases, be associated with a base system such as an Electronic Health Record (EHR) system that may retain data records of one or more users, patients, or the like. In some exemplary embodiments, a plurality of separate data systems may retain other records of different or overlapping users, e.g., with different or overlapping user information. In other cases, a base system may comprise any other type of system.

In some exemplary embodiments, EHRs, also referred to as Electronic Medical Records (EMRs), may comprise records of medical data of patients in a digital version, provider data, payer data, or the like. In some exemplary embodiments, an EHR may contain the medical and treatment histories of patients, and may be accessed via EHR software systems such as desktop applications, websites, or the like. In some exemplary embodiments, EHR systems may store data that is not synchronized with each other, such as regarding a same subject. For example, a record of a first disease of a patient may be stored at a first EHR system, and a record of a second disease of the same patient may be stored at a second EHR system.

In some exemplary embodiments, EHR systems may be used by, or on behalf of, various actors or entities such as a payer entity, a covered entity, a provider entity, or the like. In some exemplary embodiments, a payer entity may comprise a health insurance entity, an entity that assumes the risk of paying for medical treatments, or the like. In some exemplary embodiments, a provider may comprise doctors, Primary Care Physicians (PCPs), clinics, or the like, e.g., which may be supported by one or more payers. In some exemplary embodiments, a covered entity may comprise an entity who provides treatment, payment and/or operations in healthcare such as a doctor's office, dental offices, clinics, psychologists, nursing homes, pharmacies, hospitals or home healthcare agencies, health plans, insurance companies, Health Maintenance Organizations (HMOs), or the like. In some exemplary embodiments, separate independent EHR systems that retain different data records, utilize different data fields, utilize different data structures, or the like, may be used by different providers, different payers, different covered entities, or the like.

In some exemplary embodiments, EHR systems (e.g., of a clinic) may retain a database or repository that comprises sensitive medical data, such as Protected health information (PHI). In some exemplary embodiments, PHI may comprise data about a health status, provision of health care, payment for health care, or the like, that is created or collected by a covered entity, and can be linked to a specific individual, patient, or the like. In some exemplary embodiments, government regulations, privacy constraints, or the like, may impose one or more restrictions on handling PHI information. In some exemplary embodiments, when handling PHI information, EHR systems may be required to comply with regulations, constraints, or protocols, such as the Fast Healthcare Interoperability Resources (FHIR) standard created by the Health Level Seven International (HL7) healthcare standards organization, which comprises a permitted Application Programming Interface (API) for exchanging EHR records. In some exemplary embodiments, government regulations, as well as privacy constraints of clients, may prohibit unrelated parties from accessing PHI of a patient, such as a patient's medical record or payment history. In some exemplary embodiments, the privacy constraints may prevent an EHR system that is used on behalf of a patient from accessing data of the same patient that is retained in a separate EHR system, even if such information is crucial for providing medical care to the patient. In other embodiments, privacy constraints may be imposed on any other system.

In some exemplary embodiments, EHR systems that do not share with each other data about a shared patient, may suffer from one or more disadvantages, drawbacks, or the like. For example, in case an EHR system of a patient's payer and an EHR system of the patient's provider are prevented from sharing the patient's data, or do not share such data for any other reason, the provider may not know about the rights, requirements, conditions, or the like, of the patient, which may be dictated by the payer. As another example, a user accessing on behalf of a patient a first EHR system, without having access to medical recommendations from the second EHR system, may provide the user with an incorrect diagnosis at the first EHR system since the relevant medical information may be retained at the second EHR system. It is further noted that the phrase 'user' may refer to any person or automated program that utilizes a EHR system on behalf of one or more patients. For example, the user may be a provider, doctor, caretaker, employee of a covered entity, secretary, or the like, that utilizes an EHR system on behalf of a patient. In other cases, the user may be the patient herself.

In some exemplary embodiments, in order to correlate user information over different EHR systems, without violating privacy constraints imposed on each system, an extending service may be provided for retaining a separate storage of patient records, which may be accumulated from multiple separate EHR systems over which the extending service may be executed. In some exemplary embodiments, the extending service may comprise an extending server, or backend, that may be configured to retain the storage of patient records, as well as data relating to payer and provider entities, accumulate data from EHR systems, and provide data or functionalities to active EHR systems. The extending service may enable an EHR session of a patient to access medical records of the patient that are retained in different EHR systems such as of a payer entity, a provider entity, a covered entity, a combination thereof, or the like, via the storage of the extending server. For example, the extending service may implement one or more techniques disclosed in U.S. patent application Ser. No. 17/502,567, filed Oct. 15, 2021, titled "Dynamic Loading Of An Extending Application", which is incorporated by reference herein in its entirety without giving rise to disavowment, in order to provide data or functionalities to active EHR sessions.

In some exemplary embodiments, a frontend of the extending service may comprise one or more software agents that may be retained locally at end devices, at provider computers, at payer devices, or the like. In some exemplary embodiments, the agents may be configured to augment EHR systems with an augmented software layer (also referred to as "extending layer") that may indicate to a first active EHR system medical information or functionalities that are derived from one or more second EHR systems to which the first EHR system has no access. In some exemplary embodiments, utilizing patient records and related data from separated EHR systems may enable the patient or a caretaker of the patient to locate treatments gaps of the patient, to diagnose the patient in a more informed or accurate manner, to inform the patient with provider options that are made available to her by her payer, to inform the patient of additional information regarding the provider options, or the like.

In some cases, the local agent may comprise a software module such as a browser extension, which may be executed by a browser and may provide an extending layer over an EHR website. For example, the software module may comprise a Software Development Kit (SDK) that is executed over web-based EHR applications. In some cases, the local agent may comprise a software module such as a desktop agent that is stored in local disk memory of a user device, and may be executed over a desktop EHR application. The desktop agent may be a native application to the operating system of the user device, e.g., WINDOWS™ native application for a WINDOWS™ user device or a LINUX™ native application for a LINUX™ user device. Additionally or alternatively, the desktop agent may be developed using cross-platform languages, such as JAVA™ PYTHON™, or the like and be executable on the user device, either directly using a compiled version thereof, using a native Virtual Machine, using an OS-specific interpreter or the like. In some exemplary embodiments, the agent (also referred to as the "extension") may be configured to monitor a display of an EHR system, accumulate information therefrom, and provide an extending layer over the display based on the accumulated information.

In some exemplary embodiments, the extending layer may enable to augment data, content, resources, applications, functions, or the like, over a display of an end device, e.g., upon browsing a page of an EHR system. In some exemplary embodiments, in response to identifying one or more events or presented data of a browsed page of any EHR system, identifying one or more missing portions or gaps of an EHR system, or the like, the extension may be configured to generate or provide an extending layer as an overlay over the browsed page, as an injected code that is embedded in the page. In some exemplary embodiments, the augmented functionalities or applications may comprise, for example, recommendations of providers that are supported by the payer, scores or rates of doctors based on selected parameters such as cost and quality, scores or rates that are obtained from the payer's system, medication history, care gaps, diagnosis gaps, or the like. For example, the extending layer may be configured to generate an Inline Frame (Iframe) that may embed a document, e.g., a HyperText Markup Language (HTML) document, of a different EHR system within the browsed page.

In some exemplary embodiments, in order to enable the EHR system to utilize the extending service for providing the extending layer in a secure and privacy-retaining manner, it may be necessary to login to the user's account of the extending service, and identify records or functionalities in of the extending service to which the user has authorized access. For example, the user may not be authorized to access data records of patients that are not represented by the user. In some cases, EHR systems may generate or provide clients thereof with EHR credentials, while an extending service such as VIM™ may or may not provide clients thereof with dedicated credentials of the extending service. In some cases, in order to ensure that the user is authorized for accessing data from both systems (both the EHR system and the extending service), the user may be required to provide the EHR credentials for the EHR system, and to provide extending credentials for the extending service. In other cases, the extending service may not generate or provide dedicated credentials to clients thereof.

It may be desired to enable a user to utilize a single set of credentials in order to login to both EHR and extending systems, without compromising on a security of the user, the patients, or the like. In some exemplary embodiments, the EHR system may be implemented in a manner that utilizes non-SSO authentication scheme, that does not support an SSO service, or the like, thus not enabling the user to utilize the EHR credentials in order to login to both the EHR system and the extending service. In some cases, EHR systems and clinic setups may not support SSO services, such as due to the systems comprising sensitive and protected data, due to privacy constraints, due to technical limitations, or the like. In some cases, an EHR system of a small entity may not have sufficient resources for implementing SSO integration. For example, an EHR system of a small clinic may not have an Information Technology (IT) department that can implement an SSO service. In some cases, the extending service may comprise an independent system that has no access to the code of the EHR system and may not be able to modify the EHR system so that the EHR system will support an SSO service.

It is noted that the disclosed subject matter may be exemplified with relation to an extending service that is executed over different base EHR systems, but it is not limited to the medical realm or to EHR systems. As an example, the disclosed subject matter may be applied on any other extending service that is provided over any other independent or dependent base systems, or to any other types of services, systems, or applications. In some exemplary embodiments, the EHR systems that are described herein may comprise any software systems that utilize user credentials, that retain sensitive data, or the like.

Yet another technical problem dealt with by the disclosed subject matter is enhancing a user experience of users, when utilizing an extending service. For example, it may be desired that the extending layer will be enabled to monitor the browsed page and provide recommendations of doctors that are being searched for, without adversely affecting the user's workflow in the EHR system such as by being required to handle sign-ins to the extending service every time an EHR system is activated, launched, or the like. In some cases, requiring the user to login to an extending service separately, every time an EHR system is used, may adversely affect the user experience and reduce the number of usages of the extending service, which may in turn adversely affect the treatment of the user's patients.

Yet another technical problem dealt with by the disclosed subject matter is automatically activating an extending service upon any usage of any EHR system, e.g., in real time. In some exemplary embodiments, it may be desired to automatically load and activate the extending layer so that it is enabled to provide its augmented functionality, to accumulate up-to-date information regarding the patient, or the like. For example, it may be desired to enable a user to automatically login to the extending service, such as upon launching an EHR page over which the extending layer is configured to be executed, thus enabling the extending layer to monitor user interactions, monitor the display, provide augmented functionalities to the display, or the like, without manually logging in to the extending service.

In some exemplary embodiments, a potential solution may comprise utilizing a trustless manipulation procedure to login a user to two or more software systems, upon logging into a first system. For example, the trustless manipulation procedure may implement one or more steps, methods, techniques, or the like, that are disclosed in U.S. Provisional Patent Application No. 63/276,925 filed Jul. 1, 2022, titled "Trustless Single Sign On", which is incorporated by reference herein in its entirety without giving rise to disavowment. In some cases, the trustless manipulation procedure may be performed by a software agent that is executed locally on the client device. The agent may be configured to monitor the user's display, and upon identifying that the display depicts an attempt of the user to sign in to a defined first software system, e.g., an EHR system, the browser extension may be configured to scrape the user credentials that were used to sign in to the EHR system, manipulate them, and utilize them for logging on to the extending service. For example, the credentials may be manipulated by adding a salt to the credentials, using a one-way function to encrypt the credentials, using a one-way hash function to encrypt the credentials, or the like, thereby generating new manipulated credentials that can be used as additional credentials for the extending service. In some exemplary embodiments, the manipulated credentials may be sent to the backend of the extending service and stored as alternative credentials for the user account, e.g., in addition to dedicated credentials. After linking the manipulated credentials to the account of the user at the extending service, the user may be automatically signed in to the extending service every time that an EHR session is initialized, e.g., using the manipulated credentials to login to the extending service.

In some cases, a drawback of the trustless manipulation procedure may be that in order to link the account of the user at the extending service to the manipulated credentials, the user may be required to manually provide dedicated credentials of the extending service in case the manipulated credentials are not recognized by the extending service. This may be the case after a first ever attempt of a user to login to the EHR system, after a first attempt to login to the EHR system after deploying an agent of the extending service, after changing a password to the EHR system, or the like. For example, the user may be required to directly login to the extending service, using the dedicated credentials thereto, in order to link the manipulated credentials to the user's account or update the manipulated credentials that are retained at the user's account in the extending service, in case that a password of the EHR system has been modified. In some exemplary embodiments, requiring users to perform a separate login session to the extending system in such cases, may constitute a major obstacle for using the extending service. In some exemplary embodiments, the requirement to perform separate login sessions at certain points in time, may harm the user experience, cause a drop in a usage of the extending service, or the like. It may be desired to overcome such drawbacks, and enable a user to utilize the extending service without the user being required to separately login to the extending service.

Yet another technical problem dealt with by the disclosed subject matter is minimizing the required intervention of users when utilizing an extending service that is configured to be executed over a base system such as an EHR system.

Yet another technical problem dealt with by the disclosed subject matter is to prevent cybersecurity attacks related to the use of a single set of credentials associated with a first system in order to login to another system. In some cases, one or more adversaries may perform a phishing attack, or a Domain Name System (DNS) spoofing attack, which may fabricate a login session to the first system. For example, an adversary may simulate a successful login into the first system, such as using a page that visually imitates the login session to the EHR session. Hence, the visual indications that the user may receive indicating that the credentials are valid, may be an outcome of the use of the fabricated page and the credentials may not necessarily be valid. In such a scenario, it may be desired to avoid providing the adversary with access to the second system. It may be desired to overcome such security threats, and verify login sessions before providing any sensitive information from a second extending service.

One technical solution provided by the disclosed subject matter is verifying a login session to a first system, and logging into one or more second systems automatically, based on the verification, without requiring the user to provide dedicated credentials for the second systems at any point in time. For example, upon verifying a login session to an EHR system, the scraped EHR credentials may be used for logging in the user to an extending service automatically.

In some exemplary embodiments, a software agent deployed locally at an end device may be configured to monitor a display of the device, a Graphical User Interface (UI) (GUI) thereof, or the like, and identify login sessions associated to one or more first systems. For example, the agent may be configured to detect login sessions to an EHR system. In some exemplary embodiments, upon determining that a user is entering credentials to a first system (e.g., an EHR system) using one or more input mediums, the agent may scrape or capture the EHR credentials at the client side. For example, the EHR credentials may comprise the username and password of the user for an EHR system of a clinic or of any other entity.

In some exemplary embodiments, in addition to extracting the EHR credentials, one or more additional attributes of the login session may be extracted. For example, an instance name of an EHR instance presenting the login session may be extracted, a domain name of the EHR instance may be extracted, data displayed by the EHR system upon logging in to the EHR system may be extracted, or the like.

In some exemplary embodiments, the scraped EHR credentials, e.g., a password thereof, may be manipulated by the client-side agent, such as by adding a salt to the password, using a one-way function to encrypt the password, using a one-way hash function to encrypt the password, a combination thereof, or the like, thereby generating new manipulated credentials that can be used automatically for the extending service upon launching an EHR system, in case the manipulated credentials can be linked to a user account or a user record at the extending device. In some exemplary embodiments, the credentials manipulation may be performed at the client-side, e.g., to obtain enhanced security and privacy conditions. Alternatively, the credentials manipulation may be performed at any other location.

In some exemplary embodiments, prior to verifying the login session, the login session may not be considered trusted by the extending service. For example, the login session may comprise a phishing page, and may not comprise an authentic login page to an authorized EHR system. In some exemplary embodiments, in order to verify that the services and functionalities of the extending service will only be provided to non-fabricated authentic EHR systems, the login session to the EHR system (referred to as the 'EHR login session') may be verified at a backend sandbox environment. For example, the sandbox environment may comprise a headless environment without a full browser UI, or any other environment that is independent and separate from a backend of the extending service. In some exemplary embodiments, in order to verify the login session, one or more properties of the EHR login session may be provided by the agent to the sandbox environment, e.g., in a secure manner, such as using one or more encrypted or protected communication channels. For example, one or more properties of the EHR login session that are provided to the sandbox environment may comprise a Uniform Resource Locators (URL) or domain name of the EHR instance, the scraped EHR credentials, a session token of the login session, or the like.

In some exemplary embodiments, the domain name, also referred to as the URL, that was extracted from the EHR instance may be provided to the sandbox environment in order to be analyzed, compared to a whitelist of authorized EHR domains, to identify whether the EHR system that is associated with the EHR login session is reliable, to identify whether the EHR system is a fabricated system, or the like. In some exemplary embodiments, in case the URL of the EHR instance is determined to be reliable, is determined to be authentic, is detected in the whitelist of authorized systems, is not detected in a backlist of unauthorized systems, or the like, one or more verification processes may be performed at the sandbox environment in order to verify the identity of the user.

For example, the scraped EHR credentials may be provided to the sandbox environment, and the EHR login session may be attempted to be reconstructed from the sandbox environment. In some exemplary embodiments, in order to verify the EHR login session, the sandbox environment may attempt to reconstruct or reproduce the EHR login session, such as by re-launching the EHR instance in the sandbox environment. For example, the sandbox environment may launch a backend browser, e.g., a temporary browser, a non-visual browser, a headless browser, such as headless CHROME™, or the like, and navigate to the URL of the login instance via the browser. In some exemplary embodiments, the backend browser may be devoid of any GUI, and may be controlled programmatically, using an API, using command line instructions, or the like. According to an example, upon loading the login session at the sandbox environment, the scraped EHR credentials may be inserted to input fields of the rendered login instance, to determine whether the credentials are valid for the launched instance. In some cases, the reconstructed login session may be analyzed and compared to the original login session, such as in order to ensure that they are identical. As another example, the sandbox environment may invoke API calls providing the scraped EHR credentials to an EHR server that is associated to the domain of the EHR instance, to determine whether the credentials are indeed valid and the URL of the EHR instance is accurate. As another example, the sandbox environment may launch an EHR application or SDK that matches the URL of the login session, and utilize the credentials to login to the application from the sandbox environment. In some exemplary embodiments, in case a reconstructed login session to an authenticated EHR system enables the sandbox environment to successfully login to the EHR system using the scraped EHR credentials, the EHR login session may be verified and determined to be authentic, and exploitations of the extending service by an adversary may be prevented.

As another example, the user's password of the scraped EHR credentials may not be provided to the sandbox environment, such as in order to prevent security violations and exploitations. In such cases, a verification process may obtain or scrape at least one signed session token, authentication token, access token, software cookie, session cookie, Hypertext Transfer Protocol (HTTP) cookie, or the like (referred to herein as the 'session token'), that is generated by the EHR system for authenticating the original EHR login session, and utilize the session token for verifying the login session. For example, the verification may be performed at a trusted environment such as the sandbox environment. In some cases, the client-side agent may scrape the session token, and provide it to the sandbox environment to be validated, e.g., without providing the user's EHR password to the sandbox environment, and without the user's EHR password leaving the user device. In this scenario, the login session may not be reconstructed by the sandbox environment, but instead, the session token may be validated against the EHR system. For example, the sandbox environment may contact an EHR server by generating one or more API calls, and provide the session token to the EHR server for verification. In some cases, the EHR server may be associated with the URL of the original login session. For example, an address of the EHR server or a path thereto may be resolved based on the URL of the login session. The sandbox environment may ask the EHR server to verify the token. In response, the EHR server may analyze or process the token, and in case the token matches an authenticated login session of the EHR server, the EHR server may return verification data to the sandbox environment. The verification data may comprise extracted details regarding the token, user information associated with the token, an indication that the signature of the token matches the EHR system's signature, or the like. As another example, the sandbox environment may locally analyze the session token to identify therewithin user information, and verify that the scraped username from the login session matches the extracted user information from the token. In some exemplary embodiments, in case the session token is determined to be authentic, to match the username of the scraped credentials, or the like, the EHR login session may be verified and determined to be authentic, and exploitations of the extending service by an adversary may be prevented.

In some cases, any other additional verification stages may be performed. For example, after the reconstructed login process is verified, an appointed administrator user associated to the EHR system may review the verification details in order to approve or decline the login session, the user account, the user credentials, or the like.

In some exemplary embodiments, in some cases, security mechanisms such as a Two-Factor Authentication (2FA) mechanism, or a Multi-Factor Authentication (MFA) mechanism may be deployed by the underlying EHR system. In such scenarios, when attempting to reconstruct the login session, the sandbox environment may be asked to provide an additional factor for the login session. In some exemplary embodiments, in order to complete the verification of the login session in the sandbox environment, the additional factor may be obtained from the user manually or automatically. For example, a client-side agent (identical or different from the agent that scraped the credentials from the login session) may monitor the display of a user device and detect that a message including the additional factor is received from the EHR system. According to this example, the agent may scrape the additional factor from the message and provide it to the sandbox environment, for completing the reconstructed login session. As another example, the user may be prompted to provide the additional factor through a dedicated UI window, form, Iframe, or the like, which may enable the agent to provide the additional factor to the sandbox environment, for completing the reconstructed login session.

In some exemplary embodiments, in case the verification is successful, such as in case that a backend login is reconstructed and verified, one or more responsive actions may be performed. In some exemplary embodiments, the responsive actions may comprise detecting a user record or account of the user at the extending service. For example, a username of the EHR credentials may be provided to an Identity Provider (IDP) of the extending service, where it may be identified as belonging to one or more user records or accounts of the same user. As another example, one or more sub-domains of the URL of the login instance may be utilized to identify an organization to which the user belongs, such as a clinic that employs the user. In some cases, the organization may be a client of the extending service, and may be identified as such by the IDP. Based on identifying the organization name, alone or in combination with the EHR username, a record or account of the user may be detected in the backend of the extending service. As another example, the backend reconstructed login session, or the frontend EHR login session, may be monitored to accumulate user details such as a first name, a last name, an identifier, or the like, from a display of one or more EHR pages presented after successfully logging in, from a representation of the page, or the like. According to this example, the accumulated user details, alone or in combination with the EHR username, the employment organization, or the like, may be used to identify a record or account of a corresponding client in the extending service.

In some exemplary embodiments, after detecting one or more records or accounts of a user in the extending service, a linking process may be performed to link the user records to the manipulated credentials. In some exemplary embodiments, the linking process may enable the client-side agent to automatically log the user into the extending service on any subsequent EHR session, such as in case the EHR credentials remain the same (e.g., without performing a verification process and a linking process). In some exemplary embodiments, in case a user account of the user at the extending service already exists, and is detected as belonging to the same user as the EHR system's user, a responsive action may comprise adding the manipulated credentials to the user account and storing them in association therewith, as a legitimate password. In some exemplary embodiments, in case a user account of the user at the extending service does not exist, a responsive action may comprise generating a new user account for the extending service.

The new user account at the extending service may be generated to include the manipulated credentials, and other client properties such as the EHR username (which may not comprise PHI data), user details derived from the EHR display, user details derived from the URL or the instance name of the login session such an organization to which the user belongs, user records retained at the extending service in association with the organization employing the user, or the like. In some exemplary embodiments, automatically created or provisioned user accounts may be stored in an IDP at the backend of the extending service. In some cases, the determined user details may be used to populate data fields of the generated account. For example, a profession of user may be deduced automatically based on the EHR system, third party sources, the instance name of the login session (e.g., the URL of the login session), or the like.

In some exemplary embodiments, whenever the EHR password is modified, changed, or the like, the disclosed subject matter may not be adversely affected, and the user account of the user in the extending service may remain linked to the user account of the user in the EHR system. For example, since password changes may only change the password, without changing the username, the EHR username may stay consistent, and may be used to identify the corresponding user account in the extending service, and update the user account in the extending service with new manipulated credentials. For example, the client-side agent may monitor password session changes, manipulate the credentials, and automatically update the extending service with the new manipulated password. In some cases, the verification process may be performed again for password updates, e.g., automatically, with no user intervention.

One technical effect of utilizing the disclosed subject matter is enabling a user to automatically sign on to one or more applications, extending services, or the like, upon signing in to a base system such as an EHR system, without being required to provide credentials for the extending services at any point in time, regardless of password changes, initial sign ins, or the like. For example, the disclosed subject matter enables a user to automatically sign on to first and second extending applications, services, or the like, upon signing in to a base system such as an EHR system, in case that the first and second extending applications implement the disclosed linking and verification processes. As another example, the user may automatically sign on to first and second extending applications, services, or the like, upon signing in to a base system such as an EHR system, in case that the first extending application implements the disclosed linking and verification processes, and the second extending application relies on the verification process of the first extending application. In some exemplary embodiments, the users may be enabled to utilize an extending service automatically, upon logging into the base system, without the user being required to manually login to the extending service.

Another technical effect of utilizing the disclosed subject matter is enhancing a user experience by automatically logging a user into an extending service upon every usage a base system such as the EHR system. For example, a client-side agent may detect every EHR login session, and automatically manipulate the credentials and login to the extending service using the manipulated credentials. This may create a smooth and seamless integration of the extending layer with the EHR system.

Yet another technical effect of utilizing the disclosed subject matter is enabling a user to automatically sign on to extending services without implementing an SSO service.

Yet another technical effect of utilizing the disclosed subject matter is enabling a user to automatically sign on to extending services without compromising on data security, on privacy constraints, or the like. In some cases, the EHR login session may be verified independently, in a separate system that does not enable the EHR password to leak out, and in some cases does not obtain the EHR password. In case the EHR password is provided to the separate system, one or more encrypted or protected communication channels may be utilized to communicate the EHR password from the client side to the sandbox environment, thus ensuring a safe communication of the sensitive data. In some exemplary embodiments, an adversary attempting to fake an EHR system may not be able to deceive the system of the disclosed subject matter, as he may not get through the verification step. The verification of the login session may protect against DNS spoofing attacks such as a DNS server compromise attack or a Man In The Middle (MI™) attack, e.g., by reconstructing the login session in the sandbox environment or providing a session token to the EHR system. In DNS spoofing attacks, altered DNS records are used to redirect online traffic to a fraudulent website that resembles its intended destination. Once there, users are prompted to login into their account, giving the perpetrator the opportunity to steal their access credentials and other types of sensitive information. In some cases, the sandbox environment may ensure that the EHR system is authentic using a list of authorized domain names, and by reconstructing the login session in the backend.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1 illustrating an exemplary flowchart diagram of a method, in accordance with some exemplary embodiments of the disclosed subject matter.

On Step 110, a login session of a first software system, e.g., an EHR system, may be automatically identified. In some exemplary embodiments, the login session may comprise an instance of an EHR system that may be executed by a desktop application, a web browser, or the like. In some exemplary embodiments, the login session may be configured to enable a user of a user device to login to her account of the EHR system.

In some exemplary embodiments, an agent monitoring the login session may comprise a desktop agent that can be executed over a desktop application, a browser extension that can be executed over a web application, or the like. In some exemplary embodiments, the agent may be generated or provided by a party different from the provider of the first software system, e.g., by a party providing a second software system such as the extending service. In some exemplary embodiments, in order to ensure a high security level, the agent may be configured not to provide sensitive data (e.g., a password) to the extending service after deployment without first encrypting the sensitive data. For example, the agent may comprise a browser extension that is executed by a browser rendering the first software system to which the user is attempting to log in during the login session. In some exemplary embodiments, browser extensions may be configured to be executed by a browser such as a web browser, and may comprise, in some cases, source code without executables. As another example, the agent may comprise a desktop agent that can be executed over a desktop application rendering the login session. According to this example, the desktop agent may be configured monitor a display of the desktop application.

In some exemplary embodiments, the agent may identify the login session, e.g., by monitoring the device's display, screen, user interface, GUI, or the like, using computer vision techniques, machine learning techniques, heuristics-based detection, object recognition techniques, monitoring network calls, injecting Dynamic-Link Libraries (DLLs) to an existing software of the first software system, monitoring or invoking Windows™ API calls, or the like. For example, the agent may be configured to monitor a GUI of a user device that is used to login to one or more types of EHR systems. In some cases, the agent may be configured to identify one or more non-login sessions, such as password updating sessions.

On Step 120, user credentials provided to the login session may be automatically extracted. For example, in case that the first software system comprises an EHR system, EHR user credentials including a username and a password that are inserted to the EHR system or input fields thereof by the user may be obtained, scraped, extracted, or the like, e.g., by the browser extension, the desktop agent, or the like. In some exemplary embodiments, in addition to the credentials, the agent may scrape or extract one or more additional attributes of the login session, such as a domain name or URL of the login instance, data depicted by the login instance, data depicted by a subsequent page, or the like.

In some exemplary embodiments, the agent may be configured to extract user credentials provided to login sessions of any application, login sessions of specific defined systems such as of EHR systems, login sessions of EHR systems of a first type, or the like. In some exemplary embodiments, the one or more user credentials may comprise one or more user inputs to the login session. In some exemplary embodiments, the agent may scrape or extract one or more user credentials that are provided to the login session using computer vision techniques, machine learning techniques, heuristics-based detection, object recognition techniques, by monitoring ports of the user device, or the like. In some cases, the user may provide credentials via one or more communication mediums such as voice commands indicating her credentials, keyboard inputs, or the like. In some cases, the agent may scrape or extract any other session related data, such as by capturing a session token of the login session, or any other HTTP cookie or token that is associated with the login session.

On Step 130, at least a portion of the user credentials may be automatically manipulated, e.g., locally by the agent. In some exemplary embodiments, the one or more user credentials, such as the EHR password, may be manipulated by the agent, using one or more manipulations, to thereby obtain manipulated credentials. In some exemplary embodiments, the user credentials may be manipulated by applying a one-way function on the one or more user credentials, thereby limiting an ability of third parties to derive the one or more user credentials from the manipulated credentials. In some exemplary embodiments, the user credentials may be manipulated by obtaining a user-specific salt, adding the user-specific salt to the one or more user credentials (e.g., to the password), thereby obtaining salted user credentials, and applying a one-way function on the salted user credentials, to thereby further limiting an ability of third parties to derive the one or more user credentials from the manipulated credentials. Alternatively, the credentials may be manipulated in any other way.

In some cases, in case salt is used to manipulate the credentials, the salt may be obtained from a remote server (e.g., a server of the extending service), generated locally at the user device, generated locally by the agent, determined based on a locally generated key, or the like. For example, a key may be generated at a client side, such as by the client-side agent, and the key may be used to generate or determine a salt for the extracted user credentials at the user device. In some exemplary embodiments, at least one manipulation record, such as a user-specific salt, may be detected in the local storage of the user device, and may be used for manipulating the user credentials. In some exemplary embodiments, in case at least one manipulation record, such as a user-specific salt, is identified as being absent from a local storage of the user device, the at least one manipulation record may be generated, e.g., locally at the user device, thereby generating the one or more manipulations.

In some exemplary embodiments, a manipulation record such as a salt, a one-way function, a combination thereof, or the like, may be configured to manipulate the one or more user credentials. In some exemplary embodiments, upon generating or obtaining one or more manipulation records, the user credentials may be manipulated using the one or more manipulation records. In some exemplary embodiments, one or more manipulation records may be generated in response to identifying that a local memory of the user device does not retain at least one manipulation record. For example, in case a manipulation record for an EHR system is absent from the local storage of a user device, a one-way function such as a hash function may be obtained from a server, and a salt may be generated locally by the agent, together constituting the manipulation records. In some exemplary embodiments, the manipulation records may be generated in response to identifying that a local memory of the user device does not retain an authentication token that is associated to the user credentials of the first software system. For example, the authentication token may include one or more strings that correspond to the identity of the second software system, one or more strings that correspond to the manipulated credentials, one or more strings that correspond to the manipulation records, or the like. In case the token is determined to be associated with the extending system, the token may be used to login the user to the extending system.

In some exemplary embodiments, the user credentials may be manipulated in response to identifying that the login session enabled the user to login to the first software system successfully. For example, in case of an EHR system, the EHR credentials may be manipulated by hashing them with a one-way function, adding salt thereto, or the like, in case the login of the user to the EHR system is determined to be completed successfully. In some cases, the user credentials may be manipulated regardless of a determined success of the login session. In some exemplary embodiments, the extension may evaluate a success of the login session based on monitoring the user interface of the first software system after attempting to login to the first software system. For example, the login session may be estimated to be successful in case the display of the user after logging into the first software system depicts a window with the words 'successfully signed in' (e.g., using a sematic classifier), in case the display depicts a home page of the first software system, or the like.

On Step 140, the agent may automatically attempt to utilize the manipulated credentials in order to sign in to the second software system (e.g., the extending service).

In some exemplary embodiments, in case the manipulated credentials enable the user to login to the user's account in the extending service, the method may terminate, and the extending service may be configured to execute an extending layer over one or more rendered EHR pages. In some exemplary embodiments, the manipulated credentials may enable the user to login to the user's account in the extending service in case the accounts of the user at the first and second software systems were linked, in case the manipulated credentials were already added to the user account at the second software system, or the like. The extending service may be configured to provide an augmented functionality providing an additional functionality to the GUI of the EHR system, via an overlay over an EHR page displayed by the browser. In some cases, the extending layer may provide augmented applications or functionalities that can be executed over the browsed page. In some exemplary embodiments, the extending layer may derive data and functionalities from different EHR systems that retain separate data records that are associated with the same patient, or can be useful to the patient. In some exemplary embodiments, the extending service may store data from different systems. In some cases, utilizing the extending layer may enable a provider taking care of a patient to access additional information about his patient, to access additional functionalities for her patient, or the like, such as identifying background diseases of the patient that are not recorded in the EHR system used by the provider, booking a physician office visit with a physician that is not supported by the EHR system of the provider, or the like.

In some exemplary embodiments, in case the manipulated credentials do not enable the user to login to a user's account in the extending service, the method may continue to Step 150. In some exemplary embodiments, the manipulated credentials may not enable the user to login to a user's account in the extending service in case this is a first attempt to login to the EHR system, in case the agent was not deployed in a previous attempt to login to the EHR system, in case a password to the EHR system has changed without being tracked by the agent, or the like. For example, the agent may forward the manipulated credentials to an IDP of the extending service, and the IDP may indicate that the login failed, that the manipulated credentials are not found, that a username is found but the password is invalid, or the like.

On Step 150, the login session may be automatically verified, in order to ensure that the login session was not fabricated, that the login session is authentic, or the like. In some exemplary embodiments, in order to verify the login session, a sandbox environment that is separate from the extending service may be used to reconstruct the login session, such as by re-launching the login instance in the sandbox environment. In some exemplary embodiments, the sandbox environment may comprise an execution environment that is separate from a backend of the extending service, separate from a data system of the extending service, or the like. In some exemplary embodiments, the sandbox environment may not be part of the extending service, and may not have access to a storage of the extending service, to user records thereof, to sensitive data thereof, or the like. Additionally or alternatively, the sandboxed environment may be executed on a same machine or platform as the extending service, e.g., without providing the sandboxed environment with access to a storage of the extending service. In some exemplary embodiments, reconstructing the login process at the extending service may enable to authenticate and validate the scraped user credentials using the login system of the first system directly.

In some exemplary embodiments, in order to preserve the privacy of the user, it may be desired that the password to the first software system may not be accessible, in its non-manipulated form, to the extending service or the sandbox environment. In some exemplary embodiments, the one or more user credentials to the first software system, such as the EHR password, may be encrypted by the agent (e.g., using a public key of an instance of the sandbox environment), thereby obtaining encrypted credentials. In some exemplary embodiments, the encrypted credentials may be provided to the sandbox environment in its encrypted form, without providing the password itself to the sandbox environment. In some exemplary embodiments, the sandbox environment may store the obtained password in runtime, in a temporary and volatile manner, while avoiding permanently storing the password. In some exemplary embodiments, the sandbox environment may implement a rotation mechanism that periodically changes or rotates the password or an associated key, in order to increase a security level. In some exemplary embodiments, the extending service may not have access to the scraped user credentials retained temporarily at the sandbox environment. In some exemplary embodiments, the sandbox environment may be deployed at a public or private cloud, at a private or public server, on-premise, or the like. For example, the sandbox environment may comprise a DOCKER™ environment. As another example, the sandbox environment may comprise an on-premise Visual Computing Appliance (VCA) on a cloud.

In some exemplary embodiments, the sandbox environment may obtain, in addition to or instead of the credentials of the user, one or more additional properties that were scraped by the agent, such as a scraped domain name or URL of the EHR login session. In some exemplary embodiments, verifying the login session may comprise matching a domain name of the login session to a list of authorized domain names, e.g., which may be associated with the first software system. In some exemplary embodiments, the sandbox environment may analyze the URL or sub-domain thereof, and determine whether the URL or portions thereof comprises an authorized domain name. In some exemplary embodiments, the URL may be processed and compared to a whitelist of authorized domain names, to a blacklist of unauthorized domain names, or the like, in order to identify whether the system associated with the URL is reliable, whether the system is a fabricated system, or the like. For example, the sandbox environment may retain a whitelist of authorized EHR URLs or domains that are associated to known authentic EHR systems, in order to prevent third parties from fabricating new EHR systems that visually imitate known EHR system using a different (but potentially similar) domain name. As another example, a login session to an EHR system may comprise the domain name 'www.getepic.com/sign-in', and the domain may be processed to extract the subdomain 'getepic' therefrom, and determine that the login session is associated to the EHR system of EPIC!™ According to this example, a whitelist of authorized EHR domain names may be compared to the subdomain 'getepic', to the system name EPIC!™, to the entire domain name 'www.getepic.com/sign-in', or the like, in order to determine whether the URL belongs to an authorized EHR system.

In some exemplary embodiments, in case the domain or URL of the original login session is determined to be authorized, the sandbox environment may utilize the scraped domain or URL of the original login session in order to reconstruct the EHR login session. In some exemplary embodiments, an instance of the first software system may be launched in the backend browser using the URL, and the scraped user credentials may be used to perform the login process via the instance at the backend browser. For example, the sandbox environment may launch a backend browser, navigate to a URL of the EHR login session to render the login session by the browser, and insert the scraped credentials into input fields of the login session, to identify whether the EHR credentials are valid. As another example, the sandbox environment may launch an EHR application corresponding to the URL of the EHR login session, and insert the scraped credentials into input fields of a login session rendered by the application, to identify whether the credentials are accurate. As another example, the sandbox environment may send API calls to a server of an EHR system corresponding to the URL of the EHR login session, indicate the scraped credentials thereto, and obtain from the server a result indicating whether the login is successful.

In some exemplary embodiments, in case the credentials are valid for the reconstructed login session, one or more user details may be monitored and extracted from the subsequent pages of the first software system. In some exemplary embodiments, the monitored user details may be used for further verification steps, for a linking process to the extending service, or the like. For example, user identifiers, user records, treatment data, or the like, may be extracted from the original EHR login session by the client-side agent, and provided to the sandbox environment for verification. According to this example, the sandbox environment may extract from the reconstructed login session user identifiers, user records, treatment data, or the like, and compare them to the provided details, to determine whether the user details are identical. In case a difference is identified, the frontend EHR login session may be classified as a phishing attack, and the method may terminate. In some cases, the user details may be provided to the second software systems, such as in order to verify that they are accurate.

In some exemplary embodiments, instead of reconstructing a backend login session to verify the EHR login session, or in addition thereto, a session token may be utilized to verify the EHR login session. In some exemplary embodiments, the session token of the login session may comprise a token that is issued by the associated EHR system upon a successful login of the user to the EHR system, and includes a temporary signature indicating that the EHR system has authenticated the session. In some exemplary embodiments, the client-side agent may scrape the user credentials, the session token, and the URL of the login instance, and provide this information to the sandbox environment, while excluding the user's scraped password from the sent information. In some cases, the sandbox environment may contact the EHR system and utilize the session token to ensure that the domain of the EHR system is proper (e.g., indicated by a whitelist), that the user identifier of the token matches the scraped EHR username, or the like. In some cases, the sandbox environment may invoke API calls to the EHR backend, and provide the session token thereto. The API of the EHR system may process the token and provide, in response, identifying information of the associated user, such as a username thereof, or any other detail associated with the user, details associated with the EHR system, or the like. The sandbox environment may cross the obtained information against the scraped EHR username, the URL of the login session, or the like, thereby verifying that the login session was authentic.

On Step 160, the manipulated credentials may be automatically utilized in one or more manners. In some exemplary embodiments, the manipulated credentials may be utilized to create a user account for the user at the second software system. In some exemplary embodiments, the manipulated credentials may be added to a pre-existing user account of the user at the second software system. In some exemplary embodiments, the manipulated credentials may not yet be linked to a user account of the second software system, and it may not be clear which user records or accounts at the second software system are associated to the manipulated credentials of the user. In some exemplary embodiments, in case the manipulated credentials are not linked to a user account of the second software system, a matching or linking process may be performed in which data associated with the user of the first software system may be detected at the second software system.

In some exemplary embodiments, the linking process may comprise detecting one or more user-related details in a user record or user account of the extending service. For example, based on the reconstructed EHR login session, or based on API communications between a sandbox environment and the EHR system, one or more user details associated with the user may be extracted, deduced, or the like, and provided by the sandbox environment to the second software system. The user details may be used by second software system to detect the user's records or account in the extending service. As an example, an email of the user may be extracted from the reconstructed login session, a subsequent page, or the like, and used to map the user account of the first software system to user records at the second software system. In some exemplary embodiments, the user email may be compared to email entries of the IDP or any other backend storage of the second software system, in order to detect a match.

In some cases, the linking process may comprise mapping the user account of the first software system to user records at the second software system based on a scraped username of the first software system (e.g., which may or may not be identical in both systems). In some exemplary embodiments, the second software system may not have access to the password of the user to the first software system, such as due to security reasons, but may have access to the username. The username may not be manipulated, such as due to a low sensitivity level of the username. For example, based on a username of the first software system, an account or record of the user with one or more fields in which the same username appears, may be identified in an IDP of the second software system. For example, the EHR username may be mapped to the extending service's username, thereby linking the accounts of the user in both systems.

In some cases, the linking process may comprise mapping the user account of the first software system to user records at the second software system based on a URL, or domain name, of the EHR login session. As an example, an organization of the user may be extracted from the URL of the login session, and used to identify a corresponding client of the extending service. In some cases, different organizations that utilizes the first software system may have different respective URL instances, domain names, or the like. For example, a first organization may be provided with a first domain name of an EHR instance, while a second organization may be provided with a second domain name of an EHR instance. In such cases, based on a subdomain of login session, an organization to which the user belongs may be detected with strong confidence, that does not dependent on the client-side instance. In some exemplary embodiments, an account of the user at the extending service may be defined as belonging to a user on behalf of the identified organization, and may comprise an individual user account or a group user account.

In some exemplary embodiments, the disclosed subject matter may not depend on having an existing user account at the second software system, or even on retaining an existing user record at the second software system. In some exemplary embodiments, in case the extending service holds no user record or account of the user, the user account may be defined from scratch, and the extending service may generate a new account and login the user using restricted or temporary permissions, until the account is confirmed by the client, an administrator user, or the like. In some exemplary embodiments, the second software system, such as the extending service, may have one or more customers (e.g., organizations or companies), each of which be registered for a number of accounts, for a list of one or more employees or associated users that are expected to use the second software system, or the like. For example, the organization may provide a list of 50 names of employees, and the second software system may be configured to generate an account for each of the listed employees upon obtaining an indication from the sandbox environment that a user with a same name or any other matching detail is verified. As another example, a customer clinic may be directly contacted and asked to provide for each registered user, their respective usernames, names of employees, emails, identifiers, or the like. In some cases, the second software system may utilize an indication of the employees to extract therefrom user details, and create user records or user accounts for the listed employees, or the like. The generated accounts may be confirmed by the client.

In some exemplary embodiments, after the linking process, a user account in the extending service may be generated. In some exemplary embodiments, after the linking process, the user account in the EHR system may be linked or matched to a user record in the extending service, a user account in the extending service, a customer of the extending service, or the like. In some exemplary embodiments, the manipulated credentials may be added to the newly generated user account, or to the existing user account, as a potential legitimate password, thereby generating the user account.

In some exemplary embodiments, in case a user account in the extending service does not exist after the linking process, the user account may be generated based on the associated customer and properties thereof, based on the URL of the login session, based on the username of the EHR login session, based on user details accumulated by the sandbox environment during the verification process (e.g., from a reconstructed EHR session), or the like. In some exemplary embodiments, the new user account may be created to comprise an organization name to which the user belongs, properties of the organization, one or more user details (e.g., including the scraped EHR username, details extracted from the reconstructed login session, or the like), the manipulated credentials, pre-existing user records stored at the second software system, or the like.

For example, in case the EHR username comprises an email of the user, and a record with a same email is identified in the extending service, the new user account may be created to comprise the email (e.g., potentially as a new username), the remaining data of the user record, and the manipulated credentials. As another example, the user's account may be generated based on the identified organization that is determined based on a subdomain of the login session. As another example, based on the subdomain of the login session, an occupation of the user may be deduced and added to a field of a generated user account. For example, the subdomain may indicate that the user is a manager, a doctor, a secretary, a nurse, or the like. In some exemplary embodiments, the subdomain of the login session, user details extracted from the reconstructed instance by the sandbox environment, user details extracted from other verification processes, third party databases, or the like, may be used to add properties to a user account, to define values for specific fields of the user account, or the like. User properties may be classified to a respective field or property of a user account that is being generated. In some cases, the user may or may not be prompted to confirm the automatically determined populated content of the fields of the account, valuations of fields of the account, or the like.

In some exemplary embodiments, after a user account in the extending service is linked to the manipulated credentials, the manipulated credentials may be defined as the password of the extending system, that may be automatically used to login to the extending service upon logging into the first software system. For example, in case the second software system comprises an extending service that is configured to be executed over the EHR system, such as using a browser extension executed by a browser that is used to present the frontend of the EHR system, the agent may manipulate any user credentials provided to the EHR system, and use the manipulated user credentials to log the user into the extending service. In some exemplary embodiments, the agent may utilize the manipulated credentials in order to automatically sign in to the second software system. In some exemplary embodiments, linking the manipulated credentials to the user's account may enable subsequent login sessions into the second software system to automatically utilize the manipulated credentials in order to login to the user account. For example, the user may be logged in by identifying a token that matches the URL of the login session, and stores the extracted credentials, the manipulated credentials, or the like.

In some exemplary embodiments, in order to minimize the required intervention of users when utilizing the extending service, the agent may be configured to automatically update the credentials of the extending service, without requiring direct interactions of users. In some exemplary embodiments, in case a password to the second software system was changed, updated, or the like, the manipulated credentials may not be linked to a user account of the second software system. For example, in case EHR credentials that were previously used, in their manipulated form, by the extending system, have changed in the EHR system, the modified EHR credentials may not enable the agent to login the user to her user account in the extending system. In some cases, the agent may be configured to detect a password changing session in the GUI of the user device, e.g., automatically. In some exemplary embodiments, the password changing session may be configured to replace the user credentials of the first software system with updated user credentials of the first software system. In some exemplary embodiments, the client-side agent may classify the session as a password changing session, and extract the updated user credentials from the GUI. In some exemplary embodiments, the updated user credentials may be manipulated using the one or more manipulations, e.g., by the agent, thereby obtaining second manipulated credentials. In some exemplary embodiments, the updated user credentials may be manipulated by the client-side agent using a same salt, a same one-way function, or the like, that was used to manipulate the previous user credentials, or using new manipulation records. In some exemplary embodiments, the second manipulated credentials may be automatically linked to an account of the user in the second software system, similarly to the linking process described above, prior to a login attempt of the user using the updated user credentials. This may enable the agent to login to the second software system using the second manipulated credentials swiftly, without waiting for a linking process to link the manipulated credentials to the user account. Alternatively, instead of automatically detecting password changing sessions, a next login attempt of the agent to the second software system may fail, and the user account may be linked to the second manipulated credentials subsequently.

It is noted that the disclosed subject matter may be exemplified with relation to an extending service that is executed over different base EHR systems, but it is not limited to the medical realm or to EHR systems, as the first and second software systems may comprise any other systems.

Figure 2:
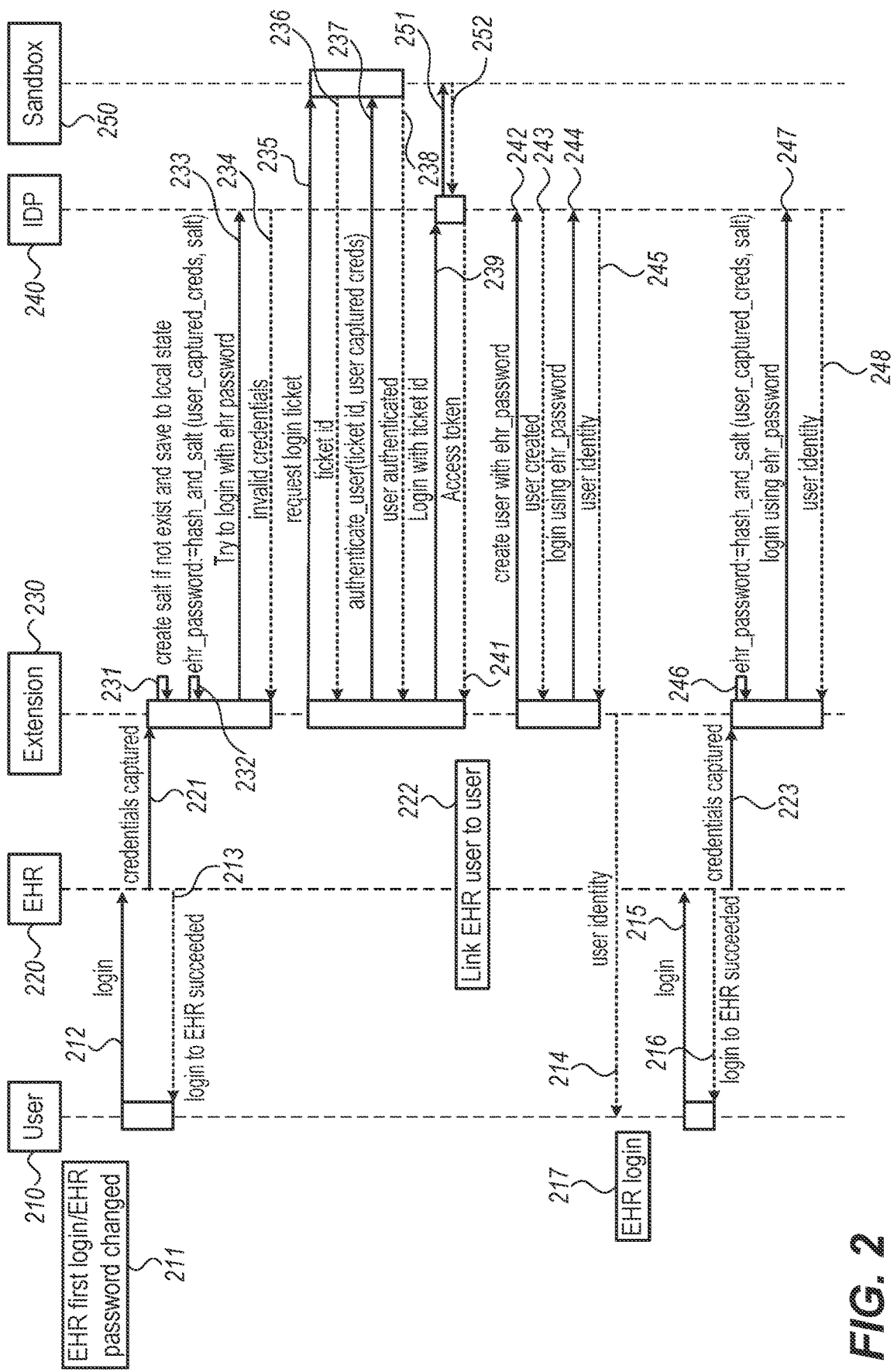
FIG. 2 illustrates an exemplary scenario, in accordance with some exemplary embodiments of the disclosed subject matter.

Referring now to FIG. 2 illustrating an exemplary scenario, in accordance with some exemplary embodiments of the disclosed subject matter.

In some exemplary embodiments, FIG. 2 is exemplified with relation to a first software system that comprises an EHR system, and a second software system that comprises an extending service that is enables to be executed over different EHR systems. It is noted that the disclosed subject matter is not limited to this scenario, and any other software systems may be utilized besides the EHR system and the extending system.

In some exemplary embodiments, a First Login Stage 211 may comprise a first attempt of a User 210 of a client device to login to EHR System 220, such as before any other attempt has ever been performed via the client device, before Extension 230 has ever monitored such an attempt of the client device, before Extension 230 has been deployed in the client device, after a password change of EHR System 220 has been implemented, or the like. In some exemplary embodiments, during First Login Stage 211, User 210 may perform a Login Attempt 212 to an EHR System 220. In some exemplary embodiments, Login Attempt 212 may comprise an attempt of User 210 to login by providing a username, password, verification codes, or the like, to respective input fields of a user interface of a login session of EHR System 220. In some exemplary embodiments, Login Attempt 212 may comprise a login session in which a GUI of a user device used by User 210 enables User 210 to interact therewith, fill input fields therein with credentials, or the like. For example, User 210 may be a clinic worker that may attempt to login to EHR System 220 on behalf of one or more patients.

In some exemplary embodiments, Extension 230 may comprise a browser extension that is executed by a browser rendering the login session, a desktop agent rendering the login session, or the like. During First Login Stage 211, Extension 230 may monitor the login session, and capture one or more properties of the login session. For example, Extension 230 may scrape the inputted credentials from Login Attempt 212 (Step 221), scrape a domain name of the login session, scrape user properties of the login session, scrape a session cookie, or the like. For example, Extension 230 may extract the domain name of the login session at the client side, which may comprise the URL or name of the session, an application instance name, portions thereof, or the like. In some exemplary embodiments, Extension 230 may identify that the GUI of the user device comprises a login session into an instance of EHR System 220, and scrape properties of the session based on this detection.

In some exemplary embodiments, after Step 221, Extension 230 may or may not monitor the user device's screen to identify whether the login attempt to EHR System 220 was successful. In some exemplary embodiments, the GUI of EHR System 220 may be monitored by Extension 230 to estimate whether the login was successful. For example, EHR System 220 may indicate to User 210, via the GUI, that the login was successful (Step 213), such as by writing 'successful login', by providing a display of a home page of EHR System 220, or the like. In some exemplary embodiments, in case the login attempt to EHR System 220 is determined to be unsuccessful, Extension 230 may not store or process further the captured credentials, other properties of the login session, or the like. In such cases, Extension 230 may capture subsequent credentials inputted by User 210 to the login page until a login session is determined successful.

In some exemplary embodiments, Extension 230 may process the captured credentials, e.g., in case the login attempt to EHR System 220 is determined to be successful. In some exemplary embodiments, Extension 230 may manipulate the captured credentials, such as a password to EHR System 220, using one or more manipulation techniques, manipulation records, or the like, such as a salt, a one-way function, or the like. For example, Extension 230 may generate or obtain a salt (Step 231) for adding to the credentials, or any other manipulation records, such as in case an existing salt associated with EHR System 220 or the domain name of the login session is not detected in a local storage of the user device, in case an existing manipulation record is not detected in a remote storage, or the like. In some cases, Extension 230 may determine whether the client device retains a manipulation record in association with the domain name of the login instance, and generate a manipulation record anew in case such a manipulation record is not detected. In some exemplary embodiments, the manipulation records may be stored in a local state of the user device, remotely, or the like, and may be used for subsequent logins of User 210 to EHR System 220, for logins of User 210 to other systems, or the like. In some exemplary embodiments, Extension 230 may store the manipulation records in a storage of the extension, in a disk storage, in a local database or repository of the client device, in a Random-Access Memory (RAM) storage of a user device over which the extension is executed, in a cache memory, a combination thereof, or the like.

In some exemplary embodiments, Extension 230 may utilize the salt, and/or one or more additional manipulating records such as a hash function or any other one-way function, in order to mask the credentials, thereby generating manipulated user credentials based on the EHR credentials (Step 232). The newly generated user credentials, also referred to as the 'manipulated credentials' or the 'MR-based credentials', may be generated based on the manipulation records. For example, the manipulated credentials may be generated by a hash function applied on the scraped EHR credentials to which the generated salt is added, or by performing any other manipulation to the EHR credentials, combination of manipulations, or the like. The EHR-based credentials may be designated for logging into a backend of the extending service, e.g., at an Identity Provider (IDP) 240 retaining user credentials and account records of the extending service. In some cases, the manipulation process may utilize additional values in addition to the EHR credentials, such as a timestamp of the login session, any other timestamp, an organization name associated with User 210, scraped user details, or the like. For example, the manipulated credentials may be generated by hashing and adding salt to a string combining the EHR credentials and the timestamp.

In some exemplary embodiments, after generating the EHR-based credentials, Extension 230 may attempt to login User 210 to a backend of the extending service, e.g., via IDP 240 (Step 233). In some exemplary embodiments, in case a user account of User 210 that is stored in IDP 240 is not linked to the EHR-based credentials, or is not yet generated, the login attempt may fail. This may be the case at a First Login Stage 211. In such cases, IDP 240 may indicate to Extension 230 that the manipulated credentials are invalid, are unknown, or the like (Step 234).

Figure 3:
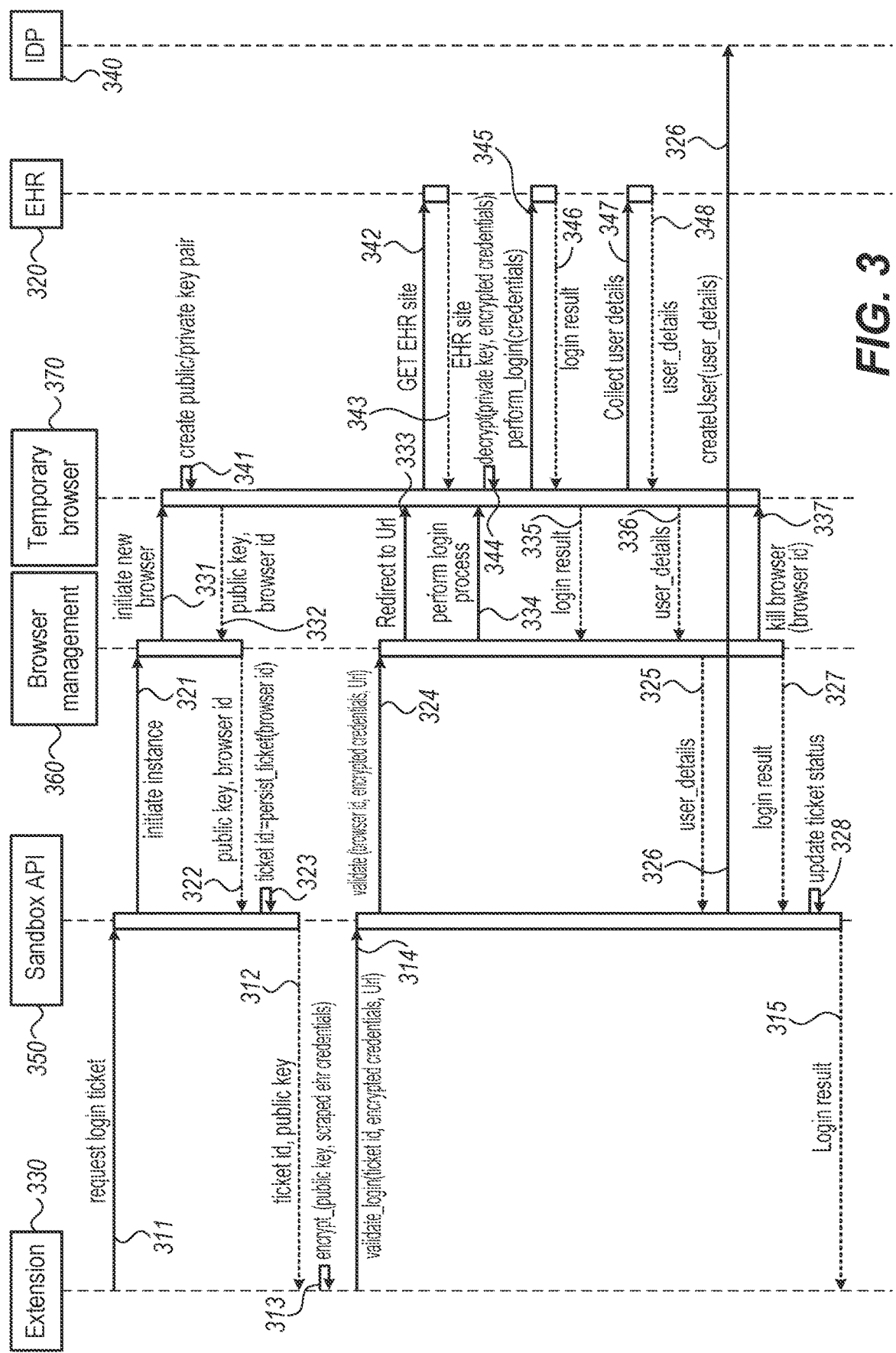
FIG. 3 illustrates an exemplary scenario, in accordance with some exemplary embodiments of the disclosed subject matter.

In some exemplary embodiments, in case of a failure to identify the account of User 210 in IDP 240 using the EHR-based credentials, the disclosed subject matter may verify that the EHR System 220 is authentic, not fabricated, or the like, e.g., according to the method of FIG. 1, FIG. 3, or the like. In some exemplary embodiments, in order to first verify that User 210 is an authorized user, Extension 230 may request a login ticket, or any other mutual authentication means, from Login Sandbox 250 (Step 235). In some exemplary embodiments, Login Sandbox 250 may start a verification process that is configured to verify the user's identity in the EHR System 220, by first providing an identifier of a login ticket (denoted 'ticket id') to Extension 230, in response to the ticket request (Step 236). In some exemplary embodiments, subsequently to obtaining the identifier of the login ticket, Extension 230 may provide the scraped user credentials, the URL of the login session, the identifier of the login ticket, or the like, to Login Sandbox 250 in order to authenticate the user identity using the scraped user credentials and the identifier (Step 237). In some exemplary embodiments, in response, Login Sandbox 250 may verify the user identity, such as by reconstructing the login session and utilizing the scraped credentials in order to attempt to login to the reconstructed session, by invoking API calls with EHR System 220 and sharing a token session therewith, or the like. In case the EHR session belongs to an authorized entity (e.g., as indicated by a whitelist), and the Login Sandbox 250 verifies the user identity (e.g., by determining that the login session is valid), Login Sandbox 250 may provide an indication that the identity of User 210 is verified to Extension 230 (Step 238). In other cases, User 210 may not be verified, and the process may be terminated. In some exemplary embodiments, after verifying the identity of User 210, Extension 230 may provide the identifier of the login ticket to IDP 240, in order to login to IDP 240 with the login ticket (Step 239). IDP 240 may expose an API that is configured to allow users to login using ticket identifiers. In some exemplary embodiments, IDP 240 may identify an account or record of User 210 using the identifier of the login ticket, and query Login Sandbox 250 to determine whether the identifier of the login ticket is authorized (251). IDP 240 may query Login Sandbox 250 regarding the status of the login ticket since IDP 240 may not be aware of the verification of the user identity at Login Sandbox 250. In response to the query, Login Sandbox 250 may determine whether the identifier of the login ticket was authorized, and in case it was (e.g., subsequently to the request of 237), Login Sandbox 250 may provide an access token to IDP 240 (252). IDP 240 may forward the access token to Extension 230 (Step 241), enabling Extension 230 to access information associated with User 210. In some cases, additional verification steps may be performed, such as by approving the user by an appointed administrator, e.g., an EHR clinic administrator.

In some exemplary embodiments, Extension 230 may perform a Linking Stage 222 that is configured to link the EHR-based credentials to an account or record of User 210 in IDP 240. In some exemplary embodiments, Linking Stage 222 may be performed in case User 210 has changed her EHR credentials (e.g., via a password change session), which may affect the EHR-based credentials, in case User 210 has never before used the EHR credentials, in case Extension 230 has never extracted the EHR credentials before, or the like. In some cases, Linking Stage 222 may be performed without requiring any additional user credentials.

In some exemplary embodiments, during the Linking Stage 222, an account for User 210 may be created in IDP 240, or modified to include the EHR-based credentials as a legitimate password. In some exemplary embodiments, Extension 230 may send the manipulated credentials to IDP 240 (Step 242), and ask to create a user account of User 210 in the backend of the extending service, e.g., in IDP 240. For example, based on the access token, records of a user of the extending service may be identified in the backend, and the records may be linked to the manipulated credentials to thereby create a user account. In other cases, a user account may pre-exist in IDP 240, and the account may be linked to the manipulated credentials based on the access token or any other data. In some exemplary embodiments, after creating or modifying the account of User 210, IDP 240 may send to Extension 230 a confirmation that an account of User 210 that is linked to the manipulated credentials has been established (Step 243). In other cases, no confirmation may be needed.

In some exemplary embodiments, upon successful creation or updating of the user account for User 210, Extension 230 may instruct IDP 240 to log User 210 into her newly generated account (Step 244), such as using the manipulated credentials and the EHR username. In some exemplary embodiments, in response to the request, IDP 240 may log User 210 into her account, and notify Extension 230 that User 210 has successfully logged in to her account in the extending service (Step 245). In some exemplary embodiments, upon obtaining from IDP 240 an indication that User 210 is logged in, Extension 230 may indicate to User 210 that she has successfully logged into the extending service, details of her newly created account, or the like (Step 214). Alternatively, User 210 may not be notified of such details.

In some exemplary embodiments, during the logged in session, Extension 230 may execute an extending layer over EHR System 220 until the EHR session of EHR System 220 terminates, until User 210 logs out of her user account, or the like. In some exemplary embodiments, during the logged in session, IDP 240 may enable the backend of the extending service to provide data and/or functionalities to the extending layer in case the account of User 210 is authorized to view or access such data. In some exemplary embodiments, upon terminating the EHR session, the execution of the extending layer may be terminated as well. Alternatively, the EHR session and the extending layer may be executed in independent processes or sessions that may or may not be terminated together.

In some exemplary embodiments, in case User 210 attempts to login to the EHR System 220 once more, during a subsequent Login Session 217, User 210 may provide the same user credentials to EHR System 220 (Step 215). In some exemplary embodiments, Extension 230 may monitor Login Session 217, such as in order to determine whether the login was successful (Step 216). For example, a successful login may be detected by using computer vision techniques, or any other processing techniques, to identify a display in user device's screen includes text or other visual indications that indicate that the login was successful, to identify that a GUI is estimated to depict a EHR system after being logged in, or the like. In some exemplary embodiments, in case the login is determined to be successful, or prior thereto, Extension 230 may scrape the user credentials that are provided to Login Session 217 (Step 223). In some exemplary embodiments, the scraped user credentials may be manipulated in a same manner as before, e.g., by manipulating the EHR password using locally stored manipulation components such as the same salt and one-way function that were previously used for manipulating the EHR credentials (Step 246).

In some exemplary embodiments, Extension 230 may send the manipulated credentials to IDP 240, in an attempt to login User 210 to the extending service (Step 247). In some exemplary embodiments, since the manipulated credentials were linked to a user account of IDP 240 at Linking Stage 226, in the current login attempt, IDP 240 may identify the manipulated credentials as belonging to the user account of User 210. In some exemplary embodiments, in response to determining that the manipulated credentials comprise a valid password of the account, IDP 240 may enable User 210 to login into her user account, and notify Extension 230 that User 210 is logged in to the extending service (Step 248).

Referring now to FIG. 3 illustrating an exemplary scenario, in accordance with some exemplary embodiments of the disclosed subject matter. In some exemplary embodiments, Extension 330, EHR System 320, and IDP 340 may correspond to Extension 230, EHR System 220 and IDP 240 (FIG. 2), respectively. In some exemplary embodiments, the method of FIG. 3 may be performed after Step 234 (FIG. 2), e.g., after scraping the user credentials and failing to login to the extending service with a manipulated version thereof.

In some exemplary embodiments, in order to ensure that a user will not be asked for credentials of the extending service, even on a first use of EHR credentials, the EHR login session may be verified by a backend login session, and EHR-based credentials may be generated and linked to a user account in the extending service to enable automatic login. The EHR-based credentials may comprise manipulated EHR credentials that are secure, as they may not enable the backend of the extending service to reconstruct the original EHR credentials due to the applied manipulations. In some exemplary embodiments, it may be desired to ensure that the backend login session, that is responsible for verifying the EHR login session, is secure, and does not enable third parties such as the extending service to determine or access to the original EHR credentials.

In some exemplary embodiments, in order to verify the EHR login session, the backend login session may be implemented by a sandbox environment that is separate from the extending service. In some exemplary embodiments, the sandbox environment may comprise a virtual environment that may generate separate processes, that may not leak data to the extending service. In some exemplary embodiments, the sandbox environment may not have access to a backend of the extending service. For example, in order to ensure that there is no drain of data from the sandbox environment to the extending service, the sandbox environment may utilize a separate docker that is at least logically separate from the extending service. In case EHR System 320 is an on-premise system, an on-premise machine may be configured to provide the sandbox environment. In other cases, the sandbox environment may be generated off-premise.

In some exemplary embodiments, the EHR credentials may be provided from Extension 330 to an instance of the sandbox environment in a secure manner, such as using a mutual authentication protocol or any other security protocol. In some exemplary embodiments, as part of a mutual authentication protocol between Extension 330 and the sandbox environment, Extension 330 may request a login ticket (e.g., a ticket granting ticket) from an API of the sandbox environment, such as from a Login Sandbox API 350 (Step 311). For example, Login Sandbox API 350 may comprise an API of Login Sandbox 250 (FIG. 2). In some exemplary embodiments, Login Sandbox API 350 may instruct a Browser Manager 360 to initiate a new instance (Step 321), with which a secured backend login session may be generated. In some exemplary embodiments, in response to the instruction, Browser Manager 360 may initiate a new temporary browser (Step 331) such as Temporary Browser 370. In some exemplary embodiments, Temporary Browser 370 may comprise a backend browser, or any application or platform that enables to render pages of EHR systems. For example, Temporary Browser 370 may comprise a headless browser (e.g., headless CHROME™). In some cases, every login attempt at the sandbox environment may comprise generating a temporary browser such as Temporary Browser 370 in a separate process, a separate container, a separate docker, or the like, which may be managed by a Docker™ engine or by any other entity. For example, separating the login attempts to different processes may enhance a privacy level of the system, and prevent leakage of the EHR credentials.

In some exemplary embodiments, a secured session may be generated between Temporary Browser 370 and Extension 330, such as in order to enable exchange of data therebetween, enabling Extension 330 to securely provide private credentials and session data to Temporary Browser 370. For example, an access token may be utilized for representing claims to be transferred between Temporary Browser 370 and Extension 330 such as a JSON Web Token (JWT). In some exemplary embodiments, in order to generate the secured session, Temporary Browser 370 may generate a public/private key pair of Temporary Browser 370 (Step 341). In some exemplary embodiments, Temporary Browser 370 may keep its private key privately, without sharing the private key. In some exemplary embodiments, Temporary Browser 370 may provide its public key, which may not be retained privately, along with an identifier of Temporary Browser 370 (e.g., as a return address), to Browser Manager 360 (Step 332), in order to establish the secure session. In some exemplary embodiments, Browser Manager 360 may forward the public key and the identifier of Temporary Browser 370 to Login Sandbox API 350 (Step 322). In some exemplary embodiments, Login Sandbox API 350 may obtain the public key of Temporary Browser 370 and the identifier of Temporary Browser 370, and generate a login ticket based thereon. For example, Login Sandbox API 350 may generate a login ticket and mark it as persistent, using the identifier of the Temporary Browser 370 (Step 323). In some exemplary embodiments, after generating the login ticket using the identifier of the Temporary Browser 370, Login Sandbox API 350 may provide the ticket, along with the public key of Temporary Browser 370, to Extension 330 (Step 312).

In some exemplary embodiments, in order to transfer the scraped EHR credentials and any other associated data securely from Extension 330 to Temporary Browser 370, Extension 330 may encrypt the scraped EHR credentials with the public key of Temporary Browser 370 (Step 313). In some exemplary embodiments, Extension 330 may instruct Login Sandbox API 350 to verify the EHR login session using the scraped EHR credentials in their encrypted version. Extension 330 may provide the ticket identifier, the encrypted user credentials, and a domain name associated to the login session to Login Sandbox API 350 (Step 314). For example, the domain name may comprise a URL of the EHR instance at the client side, an application instance name, a domain of the EHR instance, or the like. Login Sandbox API

350 may verify that the domain name of the EHR login instance, or portion thereof, comprises an authorized domain name, such as prior to performing Step 314 or any previous step. For example, the domain name may be compared to a list of officially authorized EHR domains. In some exemplary embodiments, after obtaining the instructions, Login Sandbox API 350 may forward the instructions to Browser Manager 360, along with the ticket identifier, the encrypted user credentials, and the domain name or URL of the EHR login session (Step 324).

In some exemplary embodiments, Browser Manager 360 may obtain the verification instruction, and utilize Temporary Browser 370 to reconstruct the EHR login session in the sandbox environment and to verify the credentials therewith. In some exemplary embodiments, Browser Manager 360 may instruct Temporary Browser 370 to connect or navigate to a URL or any other address of the login instance of EHR System 320 (Step 333). In some exemplary embodiments, Browser Manager 360 may provide to Temporary Browser 370 the target URL, the encrypted EHR credentials, the identifier of Temporary Browser 370, or the like. For example, Temporary Browser 370 may be instructed to redirect a domain name to an indicated domain of the login session, and load associated content. In some exemplary embodiments, in response, Temporary Browser 370 may attempt to reconstruct the login session, such as by requesting an associated EHR page or site from EHR System 320 (Step 342), and, in response, obtaining from EHR System 320 the requested login page (Step 343). For example, the requested page may comprise a login session page of EHR System 320. In some exemplary embodiments, reconstructing the EHR login session may overcomes one or more attack vectors, such as a Man-In-The-Middle (MITM) attack, a Domain Name System (DNS) spoofing attack, or the like.

In some exemplary embodiments, after reconstructing the login session, Browser Manager 360 may instruct Temporary Browser 370 to attempt to login to EHR System 320 via the login session from the sandbox environment, using the scraped credentials that were provided securely from Extension 330 (Step 334). In some exemplary embodiments, in response, Temporary Browser 370 may decrypt the encrypted credentials from Extension 330, using the private key of Temporary Browser 370, which may be retained privately at Temporary Browser 370 (Step 344), thereby obtaining the original EHR credential in a secure manner from Extension 330. Next, Temporary Browser 370 may attempt to login to EHR System 320 using the decrypted credentials (Step 345). In some exemplary embodiments, Temporary Browser 370 may obtain from EHR System 320 a result of the login attempt, e.g., indicating whether or not the login attempt has succeeded (Step 346). In some exemplary embodiments, Temporary Browser 370 may forward the result to Browser Manager 360 (Step 335). In case the reconstructed login session is successful, this may indicate that the EHR system may be trusted, and that the scraped credentials are valid.

In some cases, in addition to verifying the login session, the reconstructed login session may be used by Temporary Browser 370 in order to accumulate user details therefrom, e.g., in case a user account is not yet generated for the user (Step 347). In some exemplary embodiments, the user details may be accumulated in case the login to EHR System 320 is successful. For example, Temporary Browser 370 may accumulate data from a display of the login session, from a Document Object Model (DOM) representation thereof, or the like, such as a first name of the user, a last name of the user, an email of the user, an EHR identifier of the user, or the like. In some cases, the details may be accumulated in order to automatically provision or generate a user account for the user at the extending service based on the EHR session, and retain the account in IDP 340. In some cases, the Temporary Browser 370 may instruct EHR System 320 to provide data thereto, such as by imitating a user instruction via the user interface of EHR System 320, querying EHR System 320, or the like, and in response, EHR System 320 may display the requested details to Temporary Browser 370 (Step 348). In other cases, Temporary Browser 370 may accumulate data from EHR System 320 without interacting with the rendered page of EHR System 320, e.g., by monitoring properties of the page, monitoring the page's representation, invoking API calls to EHR System 320, or the like.

In some exemplary embodiments, upon obtaining sufficient user details (e.g., one or more defined fields), such as details that are estimated to enable to identify a user record or user account in IDP 340, details that are estimated to enable to generate a user account anew, or the like, Temporary Browser 370 may forward the accumulated user details to Browser Manager 360 (Step 336). In some exemplary embodiments, Browser Manager 360 may forward the user details to Login Sandbox API 350 (Step 325). In some exemplary embodiments, in response, Login Sandbox API 350 may draw the details out from the sandbox environment, and provide them to the extending service, e.g., to IDP 340. Login Sandbox API 350 may instruct IDP 340 to create a user account using the user details (Step 326), or to detect a user account using the details. Alternatively, the user account may be generated in any other way.

In some exemplary embodiments, subsequently to verifying the login session, provisioning the user account, or the like, Browser Manager 360 may instruct to kill the process of Temporary Browser 370, such as by using the identifier of Temporary Browser 370 (Step 337). In some cases, Browser Manager 360 may manage multiple processes of temporary browsers for respective clients, each process using a respective public and private key pair, without sharing a single process or browser between two or more clients, thereby preserving a privacy of the clients. In some exemplary embodiments, Browser Manager 360 may provide the result to Login Sandbox API 350, indicating whether or not the verification was successful, whether or not a user account was created, or the like (Step 327). In some exemplary embodiments, Login Sandbox API 350 may update a status of the ticket according to the result (Step 328). In some exemplary embodiments, Login Sandbox API 350 may forward the login result to Extension 330 (Step 315).

Figure 4:
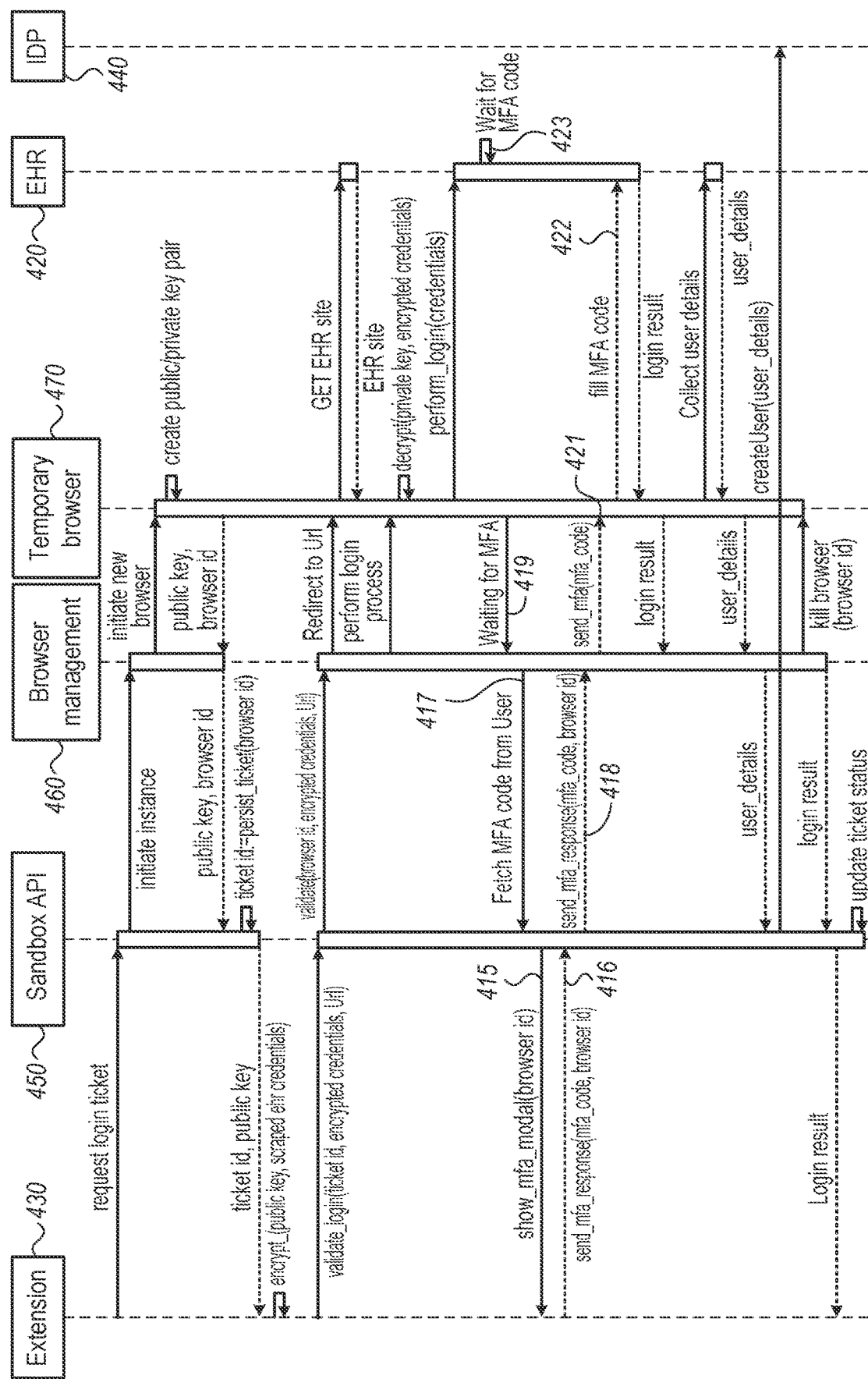
FIG. 4 illustrates an exemplary scenario, in accordance with some exemplary embodiments of the disclosed subject matter.

Referring now to FIG. 4 illustrating an exemplary scenario, in accordance with some exemplary embodiments of the disclosed subject matter. In some exemplary embodiments, Extension 430, EHR System 420, and IDP 440 may correspond to Extension 230, EHR System 220 and IDP 240 (FIG. 2), respectively. In some exemplary embodiments, FIG. 4 may depict a scenario in which EHR System 420 implements a 2FA mechanism, an MFA mechanism, or the like (referred to as 'MFA mechanism'). In some exemplary embodiments, the steps of FIG. 4 may correspond to the steps of FIG. 3, except for steps associated with the MFA mechanism.

In the depicted scenario, EHR System 420 may utilize an MFA mechanism. In some exemplary embodiments, the MFA mechanism may be implemented after Step 345 (FIG. 3), in which Temporary Browser 470 of the sandbox environment utilizes a reconstructed login session and the decrypted credentials in order to attempt to login to EHR System 420. In some exemplary embodiments, Temporary Browser 470 may insert the decrypted credentials to the appropriate input fields of the login session of EHR System 420.

In some cases, since EHR System 420 may utilize an MFA mechanism, EHR System 420 may accept the decrypted credentials, but may require an MFA factor to complete the reconstructed login session (Step 423). In some exemplary embodiments, Temporary Browser 470 may determine that one or more MFA codes or factors are required, such as by monitoring the display of EHR System 420, and identifying therein a request for an MFA factor. Temporary Browser 470 may indicate to Browser Manager 460 that EHR System 420 is expecting to obtain an MFA factor (Step 419). In some exemplary embodiments, in response, Browser Manager 460 may instruct Login Sandbox API 450 to fetch an MFA code from the client side (Step 417).

In some exemplary embodiments, Login Sandbox API 450 may instruct Extension 430, at the client-side, to present to the user an MFA model using the identifier of the Temporary Browser 470 (Step 415). For example, the MFA model may present an overlay depicting the display of Temporary Browser 470, which may render the login session of EHR System 420. In some exemplary embodiments, the user may obtain the MFA factor from the EHR System 420, e.g., at a cellular phone of the user, via a message medium, or the like. In some exemplary embodiments, the user may provide the MFA factor to Extension 430, such as via the presented MFA model, an input field thereof, or the like. For example, the user may obtain the MFA code via a cellular message sent to a user device of the user, via a phone call, of via any other indication or message, and provide it as an input to an input element control presented by Extension 430.

In some exemplary embodiments, in response to obtaining the MFA factor or code from the user, Extension 430 may send the MFA factor, along with the identifier of the respective Temporary Browser 470 rendering the reconstructed login session, to Login Sandbox API 450 (Step 416). In some exemplary embodiments, Login Sandbox API 450 may forward the factor, along with the identifier of the Temporary Browser 470, to Browser Manager 460 (Step 418). In some exemplary embodiments, Browser Manager 460 may forward the factor to Temporary Browser 470 (Step 421). In some exemplary embodiments, Temporary Browser 470 may obtain the factor from Browser Manager 460 and utilize the MFA factor to complete the login session, such as by inserting the code into an input field of the rendered interface of EHR System 420 (Step 422).

In some exemplary embodiments, after inserting the factor to the login session, Temporary Browser 470 may obtain a result from EHR System 420, indicating whether or not the login attempt has succeeded. For example, the result may indicate that the factor was valid, that the factor is invalid, or the like.

Figure 5:
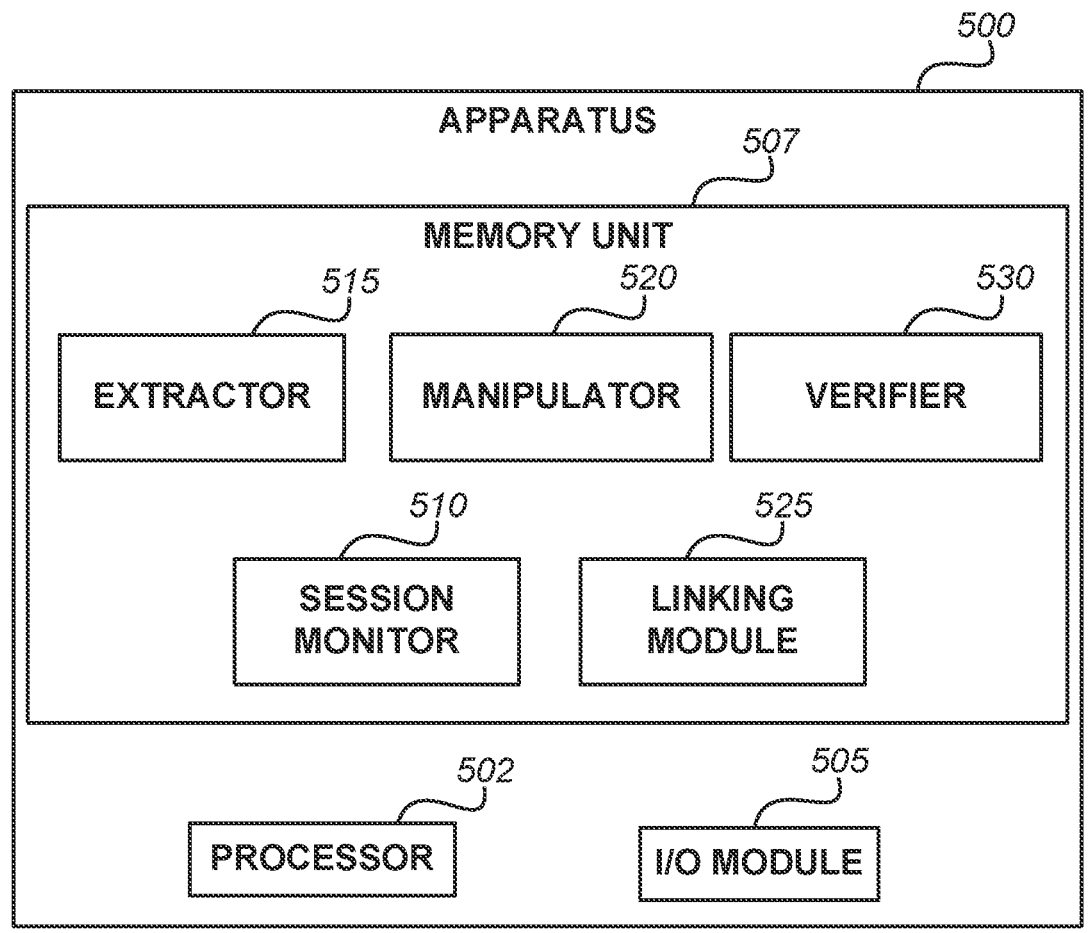
FIG. 5 illustrates an exemplary block diagram of an apparatus, in accordance with some exemplary embodiments of the disclosed subject matter.

Referring now to FIG. 5 showing a block diagram of an apparatus, in accordance with some exemplary embodiments of the disclosed subject matter.

In some exemplary embodiments, an Apparatus 500 may comprise a Processor 502. Processor 502 may be a Central Processing Unit (CPU), a microprocessor, an electronic circuit, an Integrated Circuit (IC) or the like. Processor 502 may be utilized to perform computations required by Apparatus 500 or any of its subcomponents. Processor 502 may be configured to execute computer-programs useful in performing the methods or processes of FIGS. 1-4, or the like.

In some exemplary embodiments of the disclosed subject matter, an Input/Output (I/O) Module 505 may be utilized to provide an output to and receive input from a user. I/O Module 505 may be used to transmit and receive information to and from the user or any other apparatus, e.g., a server, in communication therewith.

In some exemplary embodiments, Apparatus 500 may comprise a Memory Unit 507. Memory Unit 507 may be a short-term storage device or long-term storage device. Memory Unit 507 may be a persistent storage or volatile storage. Memory Unit 507 may be a disk drive, a Flash disk, a Random Access Memory (RAM), a memory chip, or the like. In some exemplary embodiments, Memory Unit 507 may retain program code operative to cause Processor 502 to perform acts associated with any of the subcomponents of Apparatus 500. In some exemplary embodiments, Memory Unit 507 may retain program code operative to cause Processor 502 to perform acts associated with any of the steps in FIGS. 1-4, or the like.

The components detailed below may be implemented as one or more sets of interrelated computer instructions, executed for example by Processor 502 or by another processor. The components may be arranged as one or more executable files, dynamic libraries, static libraries, methods, functions, services, or the like, programmed in any programming language and under any computing environment.

In some exemplary embodiments, Session Monitor 510 may be configured to monitor login sessions, password changing sessions, or the like, e.g., periodically or continuously. In some exemplary embodiments, Session Monitor 510 may detect events of login sessions that may or may not be associated to a defined application type, website, or the like. For example, Session Monitor 510 may be configured to detect an event in which a user logs into a first software system, e.g., a certain EHR system, changes a password thereof, or the like, while logging into another system may not be considered an event.

In some exemplary embodiments, Extractor 515 may be configured to obtain indications of detected sessions from Session Monitor 510, and extract one or more properties thereof. Extractor 515 may extract user credentials that are inputted by a user to a session through an inputting device, a vocal command, an automated password inserter, or the like. In some exemplary embodiments, user inputs may be provided via one or more keyboards, mouses, touchscreens, vocal command systems, or the like, which may or may not be associated with I/O Module 505. In some exemplary embodiments, Extractor 515 may extract from identified login sessions properties such as a domain of the session.

In some exemplary embodiments, Manipulator 520 may be configured to manipulate the user credentials that were extracted by Extractor 515 or a portion thereof, using one or more user-specific salts, one-way functions, or the like, that may be retained locally in the user device, remotely on behalf of the user device, or the like. In some cases, different manipulations may be stored for a same user device, and may be used for different underlying systems to which the user may login. For example, a user may utilize two different EHR systems, and may locally retain separate salts and hash functions for each system, e.g., in association with a domain name of each EHR system.

In some exemplary embodiments, Linking Module 525 may attempt to utilize the manipulated credentials manipulated by Manipulator 520, in order to login to an extending service. In case the manipulated credentials are not linked to a user account at the extending service, the login attempt may fail. In such cases, Linking Module 525 may instruct Verifier 530 to first verify the EHR login session monitored by Session Monitor 510.

In some exemplary embodiments, Verifier 530 may verify the EHR login session monitored by Session Monitor 510. In some exemplary embodiments, Verifier 530 may be deployed at a sandbox environment that separate from the extending service. In some exemplary embodiments, Linking Module 525 may send attributes of the login session, that were extracted by Extractor 515, to Verifier 530 at the sandbox environment. In some exemplary embodiments, Verifier 530 may determine whether the extracted domain of the login session is an authorized domain, and in case it is, Verifier 530 may attempt to reconstruct the login session by navigating to the extracted domain name. Verifier 530 may utilize the extracted user credentials in order to attempt to login to the reconstructed login session, thereby verifying that the session is authentic and the user credentials are valid. In some cases, Verifier 530 may extract user details, user information, user properties, or the like, from the reconstructed session with the EHR system. In other cases, such as in case Verifier 530 has no access to the password of the user, Verifier 530 may utilize a session token to verify the login session, such as by invoking API calls to the EHR system, obtaining user information from the EHR system in response, and verifying that the user information obtained from the EHR system matches scraped attributes of the login session.

In case the EHR login session is verified, Verifier 530 may indicate this to Linking Module 525. Linking Module 525 may, in response, generate an account for the user that includes the manipulated credentials as a legitimate password. Linking Module 525 may detect a corresponding user of the extending service based on an organization to which the user belongs (e.g., as indicated by the domain name of the EHR login session), the extracted username, the extracted user details, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   automatically identifying a login session in a Graphical User Interface (GUI) of a user device, wherein the login session is configured to enable a user of the user device to login to a first software system;
   automatically extracting one or more user credentials from the login session, wherein the one or more user credentials comprise one or more user inputs to the login session;
   automatically manipulating at least a portion of the one or more user credentials using one or more manipulations, thereby obtaining manipulated credentials;
   automatically verifying the login session, wherein said verifying comprises ensuring that the login session is authentic, wherein said verifying comprises:
      encrypting the one or more user credentials, thereby obtaining encrypted credentials,
      providing the encrypted credentials to a separate environment, and
      reconstructing the login session at the separate environment, thereby obtaining a reconstructed login session; and
   automatically adding the manipulated credentials to an account of the user in a second software system, wherein the manipulated credentials can be utilized to login to the account, wherein the second software system is independent from the separate environment.

2. The method of claim 1, wherein said adding comprises creating the account for the user in the second software system.

3. The method of claim 2 further comprising:
   automatically extracting, at the separate environment, user details from the reconstructed login session, wherein the separate environment comprises a sandbox environment,
   automatically providing the user details from the sandbox environment to the second software system, and
   automatically populating, at the second software system, fields of the account using the user details.

4. The method of claim 3 further comprising prompting the user to confirm populated content of the fields of the account.

5. The method of claim 1, wherein said encrypting comprises encrypting the one or more user credentials using a public key of a backend browser, wherein the backend browser is executed in the separate environment, wherein said reconstructing the login session comprises navigating to the login session via the backend browser.

6. The method of claim 5, wherein the backend browser comprises a backend browser that is devoid of any GUI.

7. The method of claim 1, wherein said verifying comprises matching a domain name of the login session to a list of authorized domain names associated with the first software system.

8. The method of claim 1 further comprising:
   automatically extracting a domain name of the login session as part of said automatically extracting,
   analyzing the domain name to detect an organization name, and
   detecting the account of the user in the second software system based on the organization name.

9. The method of claim 1, wherein said manipulating comprises applying a one-way function on the one or more user credentials, whereby limiting an ability of deriving the one or more user credentials from the manipulated credentials.

10. The method of claim 1, wherein said manipulating comprises obtaining a user-specific salt, adding the user-specific salt to the one or more user credentials, thereby obtaining salted user credentials, and applying a one-way function to the salted user credentials, to thereby limit an ability of deriving the one or more user credentials from the manipulated credentials.

11. The method of claim 1 further comprising:
identifying that at least one manipulation record is absent from a local storage of the user device, wherein the at least one manipulation record is configured to manipulate the one or more user credentials;
generating the at least one manipulation record, thereby generating the one or more manipulations; and
performing said manipulating using the at least one manipulation record.

12. The method of claim 1, wherein said manipulating is performed after identifying that the login session enabled the user to login to the first software system.

13. The method of claim 1, wherein the second software system is configured to extend a functionality of the first software system.

14. The method of claim 13, wherein the GUI of the first software system is executed using a browser, wherein the second software system is associated with a browser extension that is executed by the browser, whereby the second software system provides an augmented functionality providing an additional functionality to the GUI of the first software system via an overlay over a page displayed by the browser.

15. The method of claim 13, wherein the GUI of the first software system is executed using a desktop application, wherein the second software system is associated with a desktop agent that is executed over the desktop application, whereby the second software system provides an augmented functionality providing an additional functionality to the GUI of the first software system via an overlay over a page displayed by the desktop application.

16. The method of claim 1, wherein the separate environment comprises an on-premise sandbox environment.

17. The method of claim 1 further comprises:
automatically identifying a second login session of the user to the first software system;
automatically extracting the one or more user credentials from the second login session;
automatically manipulating the at least the portion of the one or more user credentials extracted from the second login session using the one or more manipulation thereby obtaining the manipulated credentials; and
logging into the second software system using the manipulated credentials, whereby the user is logged into the second software systems without the user manually providing credentials to the second software system.

18. A method comprising:
automatically identifying a login session in a Graphical User Interface (GUI) of a user device, wherein the login session is configured to enable a user of the user device to login to a first software system;
automatically extracting one or more user credentials from the login session, wherein the one or more user credentials comprise one or more user inputs to the login session;
automatically manipulating at least a portion of the one or more user credentials using one or more manipulations, thereby obtaining manipulated credentials;
automatically verifying the login session, wherein said verifying comprises ensuring that the login session is authentic, wherein said verifying comprises:
providing a session token of the login session to a separate environment,
invoking Application Programming Interface (API) calls from the separate environment to the first software system, the API calls providing the session token to the first software system, and
obtaining, at the separate environment, verification data from the first software system, wherein the verification data is determined by the first software system based on the session token; and
automatically adding the manipulated credentials to an account of the user in a second software system, wherein the manipulated credentials can be utilized to login to the account, wherein the second software system is independent from the separate environment.

19. The method of claim 18, wherein said verifying the login session further comprises:
providing a username from the one or more user credentials to the separate environment, wherein a password from the one or more user credentials is not provided to the separate environment; and
utilizing the API calls to verify an identity of the user by the first software system, wherein the first software system is configured to identify an account of the user in the first software system based on the session token and to provide the verification data to the separate environment, wherein said utilizing comprises comparing the username to the verification data to ensure that they match, whereby the login session is identified without providing the password to any device that is external from the user device.

20. The method of claim 18, wherein the separate environment comprises an on-premise sandbox environment, wherein the second software system is configured to extend a functionality of the first software system.

21. The method of claim 18 further comprising:
automatically extracting a domain name of the login session as part of said automatically extracting,
analyzing the domain name to detect an organization name, and
detecting the account of the user in the second software system based on the organization name.

22. An apparatus comprising a processor and coupled memory, said processor being adapted to:
automatically identify a login session in a Graphical User Interface (GUI) of a user device, wherein the login session is configured to enable a user of the user device to login to a first software system;
automatically extract one or more user credentials from the login session, wherein the one or more user credentials comprise one or more user inputs to the login session;
automatically manipulate at least a portion of the one or more user credentials using one or more manipulations, thereby obtaining manipulated credentials;
automatically verify the login session, wherein said verify comprises ensuring that the login session is authentic, wherein said verify comprises:
encrypting the one or more user credentials, thereby obtaining encrypted credentials,
providing the encrypted credentials to a separate environment, and
reconstructing the login session at the separate environment, thereby obtaining a reconstructed login session; and
automatically add the manipulated credentials to an account of the user in a second software system, wherein the manipulated credentials can be utilized to login to the account, wherein the second software system is independent from the separate environment.

23. The apparatus of claim 22, wherein said encrypting comprises encrypting the one or more user credentials using a public key of a backend browser, wherein the backend browser is executed in the separate environment, wherein said reconstructing the login session comprises navigating to the login session via the backend browser, wherein the backend browser comprises a backend browser that is devoid of any GUI.

24. A computer program product comprising a non-transitory computer readable medium retaining program instructions, which program instructions when read by a processor, cause the processor to:
  automatically identify a login session in a Graphical User Interface (GUI) of a user device, wherein the login session is configured to enable a user of the user device to login to a first software system;
  automatically extract one or more user credentials from the login session, wherein the one or more user credentials comprise one or more user inputs to the login session;
  automatically manipulate at least a portion of the one or more user credentials using one or more manipulations, thereby obtaining manipulated credentials;
  automatically verify the login session, wherein said verify comprises ensuring that the login session is authentic, wherein said verify comprises:
    providing a session token of the login session to a separate environment,
    invoking Application Programming Interface (API) calls from the separate environment to the first software system, the API calls providing the session token to the first software system, and
    obtaining, at the separate environment, verification data from the first software system, wherein the verification data is determined by the first software system based on the session token; and
  automatically add the manipulated credentials to an account of the user in a second software system, wherein the manipulated credentials can be utilized to login to the account, wherein the second software system is independent from the separate environment.

25. The computer program product of claim 24, wherein said verifying the login session further comprises:
  providing a username from the one or more user credentials to the separate environment, wherein a password from the one or more user credentials is not provided to the separate environment; and
  utilizing the API calls to verify an identity of the user by the first software system, wherein the first software system is configured to identify an account of the user in the first software system based on the session token and to provide the verification data to the separate environment, wherein said utilizing comprises comparing the username to the verification data to ensure that they match, whereby the login session is identified without providing the password to any device that is external from the user device.

* * * * *